United States Patent
Park et al.

(10) Patent No.: US 10,437,357 B2
(45) Date of Patent: Oct. 8, 2019

(54) ELECTRONIC DEVICE, WEARABLE DEVICE, AND METHOD FOR CONTROLLING SCREEN OF ELECTRONIC DEVICE

(71) Applicant: Samsung Electronics Co., Ltd., Gyeonggi-do (KR)

(72) Inventors: YoungHa Park, Gyeonggi-do (KR); Mohamed Akram Ulla Shariff, Bangalore (IN); Sang-Uk Jeon, Gyeonggi-do (KR); Kusumakar Dwivedi, Bangalore (IN)

(73) Assignee: Samsung Electronics Co., Ltd (KR)

( * ) Notice: Subject to any disclaimer, the term of this patent is extended or adjusted under 35 U.S.C. 154(b) by 45 days.

(21) Appl. No.: 15/381,523

(22) Filed: Dec. 16, 2016

(65) Prior Publication Data

US 2018/0011555 A1   Jan. 11, 2018

(30) Foreign Application Priority Data

Jul. 6, 2016   (KR) ........................ 10-2016-0085657

(51) Int. Cl.
| | | |
|---|---|---|
| *G06F 3/0362* | (2013.01) | |
| *G06F 3/01* | (2006.01) | |
| *G06F 3/038* | (2013.01) | |
| *G06F 3/0482* | (2013.01) | |
| *H04L 29/06* | (2006.01) | |
| *H04W 12/06* | (2009.01) | |
| *G04G 21/00* | (2010.01) | |
| *G06F 1/16* | (2006.01) | |
| *G06F 3/0484* | (2013.01) | |

(52) U.S. Cl.
CPC .......... *G06F 3/0362* (2013.01); *G04G 21/00* (2013.01); *G06F 1/163* (2013.01); *G06F 3/011* (2013.01); *G06F 3/038* (2013.01); *G06F 3/0482* (2013.01); *G06F 3/04847* (2013.01); *H04L 63/083* (2013.01); *H04L 63/0853* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 8,629,835 B2 * | 1/2014 | Lee | ........................ G06F 3/0346 345/158 |
| 9,046,920 B1 * | 6/2015 | Buchheit | ................ G06F 3/0482 |
| 2008/0263458 A1 * | 10/2008 | Altberg | .................... H04L 12/66 715/757 |
| 2016/0054797 A1 | 2/2016 | Tokubo et al. | |
| 2016/0054798 A1 | 2/2016 | Messingher et al. | |
| 2016/0054837 A1 | 2/2016 | Stafford | |

* cited by examiner

*Primary Examiner* — Gustavo Polo
(74) *Attorney, Agent, or Firm* — The Farrell Law Firm, P.C.

(57) ABSTRACT

A method for controlling a screen in an electronic device is provided. The method includes receiving, from a first external device, rotation input information entered by rotation of a rotation input device included in the first external device, and controlling an object displayed on a display based on the received rotation input information.

16 Claims, 18 Drawing Sheets

ELECTRONIC DEVICE, WEARABLE DEVICE, AND METHOD FOR CONTROLLING SCREEN OF ELECTRONIC DEVICE

PRIORITY

This application claims priority under 35 U.S.C. § 119(a) to Korean Patent Application Serial No. 10-2016-0085657, which was filed in the Korean Intellectual Property Office on Jul. 6, 2016, the entire disclosure of which is incorporated herein by reference.

BACKGROUND

1. Field of the Disclosure

The present disclosure generally relates to an electronic device, a wearable device, and more particularly, to a method for controlling a screen (or a display) of the electronic device.

2. Description of the Related Art

Electronic devices may be worn on the user's body. These electronic devices are commonly called wearable devices, and various types of wearable devices have been developed. For example, wearable devices include various types that are attachable and detachable to/from the human body or clothing, such as head-mounted wearable devices (e.g., eyeglasses), wrist-mounted wearable devices (e.g., watch or wristband), contact lens-type wearable devices, ring-type wearable devices, shoe-type wearable devices or clothing-type wearable devices. Wearable devices may allow the user to wear the electronic devices on his/her body, like clothing or eyeglasses, thereby increasing portability and accessibility.

Among the electronic devices that may be worn on the user's body, head mounted wearable devices such as, for example, the head mounted display (HMD), have been mainly developed. The HMD may include a see-through type HMD supporting augmented reality (AR), and a see-closed type HMD supporting virtual reality (VR).

The see-through type HMD may synthesize and combine virtual targets or objects based on the real world, using characteristics of semi-permeable lens, thereby reinforcing and providing additional information that may not be obtained only through the real world. The see-closed type HMD is the type in which two displays are placed in front of the user's eyes, allowing the user to enjoy alone the content (e.g., games, movies, streaming, broadcasting, etc.) that is provided through an external input, on the independent screen, thereby providing a superior immersion experience.

According to the existing technology, a study has been made on the way to mount and use an electronic device (e.g., a smart phone) equipped with a separate display device or a wearable device, as a display means.

When the user mounts and uses various sizes and types of electronic devices (e.g., head mounted wearable devices), a button for controlling a display of the electronic devices may be included in the electronic devices.

The user may control objects displayed on the display of the electronic device by manipulating the button. However, it may be difficult for the user to find or manipulate the button, because the user's view is obscured by the wearable device.

SUMMARY

According to an aspect of the present disclosure, an electronic device, a wearable device, and a method for controlling a screen of the electronic device are provided, in which when an electronic device equipped with a display means is mounted on a wearable device, the electronic device searches for (or scans) a device with a rotation input device among the external electronic devices adjacent to the electronic device, and controls the screen of the electronic device based on rotation input information entered through the rotation input device.

In accordance with an aspect of the present disclosure, an electronic device is provided that includes a housing, a display unit exposed to the housing, a communication module disposed inside the housing, a processor disposed inside the housing and electrically connected to the communication module, and a memory electrically connected to the processor. The memory stores instructions, which when executed by the processor, cause the electronic device to receive, from a first external device, rotation input information entered by rotation of a rotation input device included in the first external device through the communication module, and control an object displayed on the display unit based on the received rotation input information.

In accordance with another aspect of the present disclosure, a method is provided for controlling a screen in an electronic device. The method includes receiving, from a first external device, rotation input information entered by rotation of a rotation input device included in the first external device, and controlling an object displayed on a display unit based on the received rotation input information.

BRIEF DESCRIPTION OF THE DRAWINGS

These and other aspects, features and advantages of the present disclosure will become more apparent from the following description taken in conjunction with the accompanying drawings, in which.

Throughout the drawings, like reference numerals will be understood to refer to like parts, components, and structures.

DETAILED DESCRIPTION

Figure 1:
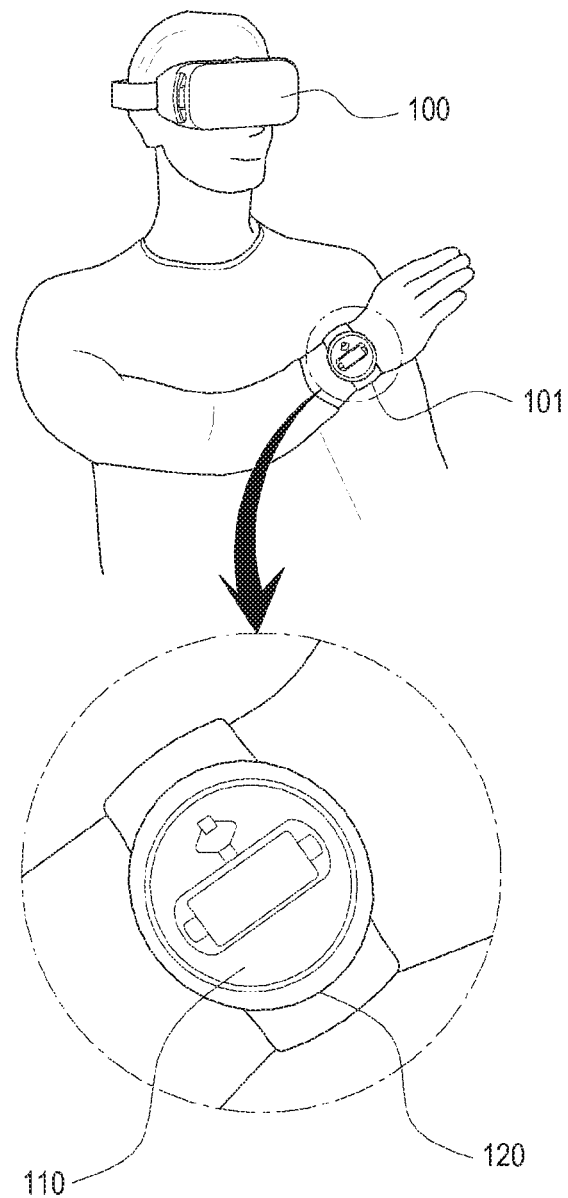
FIG. 1 illustrates controlling a screen of an electronic device using a wearable device according to an embodiment of the present disclosure.

Hereinafter, an embodiment of the present disclosure will be disclosed with reference to the accompanying drawings. However, the present disclosure is not limited to particular embodiments, and it should be construed as including various modifications, equivalents, and/or alternatives according to the embodiments of the present disclosure.

In the present disclosure, expressions such as "having," "may have," "comprising," or "may comprise" indicate the existence of a corresponding characteristic (such as an element, a numerical value, function, operation, or component) and do not exclude the existence of additional characteristics.

In the present disclosure, expressions such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various exemplary embodiments may represent various elements regardless of the order and/or importance and do not limit the corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element may be directly connected to the other element or may be connected to the other element through a third element. However, when it is described that an element (such as a first element) is "directly connected" or "directly coupled" to another element (such as a second element), it means that there is no intermediate element (such as a third element) between the element and the other element.

The expression "configured to (or set)" as used in the present disclosure may be used interchangeably with, for example, "suitable for," "having the capacity to," "designed to," "adapted to," "made to," or "capable of" according to a situation. The term "configured to (or set)" does not always mean only "specifically designed to" by hardware. Alternatively, in some situation, the expression "apparatus configured to" may mean that the apparatus "may" operate together with another apparatus or component. For example, the phrase "a processor configured (or set) to perform A, B, and C" may be a general-purpose processor (such as a CPU or an application processor) that may perform a corresponding operation by executing at least one software program stored at an exclusive processor (such as an embedded processor) for performing a corresponding operation or at a memory device.

Terms defined in the present disclosure are used for only describing a specific embodiment and do not have limit the scope of other exemplary embodiments. When used in a description of the present disclosure and the appended claims, a singular form may include a plurality of forms unless it is explicitly differently represented. Technical terms and scientific terms used here may have the same meaning as a meaning that may be generally understood by a person of common skill in the art. Terms defined in general dictionaries among terms used herein have the same meaning as or a meaning similar to that of a context of related technology and are not analyzed as an ideal or excessively formal meaning unless explicitly defined. In some cases, terms defined in the present disclosure cannot exclude the present embodiments.

An electronic device according to an embodiment of the present disclosure may include at least one of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device. The wearable device may include at least one of an accessory-type wearable device (e.g., a watch, a ring, a bracelet, an anklet, a necklace, glasses, a contact lens, or a head mounted device (HMD)), a fabric/clothing-integrated wearable device (e.g., electronic clothing), a body-mounted wearable device (e.g., a skin pad or tattoo), or a bio-implantable wearable device (e.g., a implantable circuit). The electronic device may include at least one of, for example, a television (TV), a digital video disk (DVD) player, an audio player, a refrigerator, an air conditioner, a cleaner, an oven, a microwave oven, a washer, an air purifier, a set-top box, a home automation control panel, a security control panel, a media box (e.g., a Samsung HomeSync™, an Apple TV™, or a Google TV™), a gaming console (e.g., Xbox™ or PlayStation™), an electronic dictionary, an electronic key, a camcorder or a digital photo frame.

The electronic device may include at least one of various medical devices (e.g., various portable medical meters (e.g., a blood glucose meter, a heart rate meter, a blood pressure meter, a body temperature meter or the like), a magnetic resonance angiography (MRA) device, a magnetic resonance imaging (MRI) device, a computed tomography (CT) device, a medical camcorder, an ultrasonic device or the like), a navigation device, a global navigation satellite system (GNSS), an event data recorder (EDR), a flight data recorder (FDR), an automotive infotainment device, a marine electronic device (e.g., a marine navigation device, a gyro compass or the like), avionics, a security device, a car head unit, an industrial or household robot, a drone, an automatic teller machine (ATM), point of sales (POS) terminal, or an Internet of things (IoT) device (e.g., an electric light bulb, various sensors, an electricity or gas meter, a sprinkler device, a fire alarm, a thermostat, a streetlamp, a toaster, fitness equipment, a hot water tank, a heater, a boiler or the like).

The electronic device may include at least one of a part of the furniture, the building/structure or a car, an electronic board, an electronic signature receiving device, a projector, or various meters (e.g., meters for water, electricity, gas or radio waves. The electronic device may be flexible, or may be a combination of the above-described various devices. An electronic device according to an embodiment of the present disclosure is not limited to the above above-described devices. In the present disclosure, the term 'user' may refer to a person using the electronic device, or a device (e.g., an artificial intelligence electronic device) using the electronic device.

FIG. 1 illustrates controlling a screen of an electronic device using a wearable device according to an embodiment of the present disclosure.

Referring to FIG. 1, a user may wear an electronic device 100 and a wearable device 101. For example, the electronic device 100 may be a wearable device (e.g., a face mounted device) on which a display device or an electronic device (e.g., a smart phone) with a display device may be mounted.

According to an embodiment of the present disclosure, the wearable device 101 may include a display unit 110 with a touch screen, or a rotation input device 120, and may be fixed to a part (e.g., wrist or neck) of the user's body in the form of a watch. For example, the wearable device 101 may transfer the rotation input information entered through the rotation input device 120 to the interior of the wearable device 101, or may transmit the rotation input information to the electronic device 100.

According to an embodiment of the present disclosure, in a case where a separate electronic device is mounted on the electronic device 100 or the user wears the electronic device 100, the electronic device 100 may output a virtual reality (VR) screen. For example, the VR screen may be output in a stereoscopic image format.

According to an embodiment of the present disclosure, the rotation input device 120 of the wearable device 101 may be configured in the form of a bezel surrounding the display unit 110, or may be configured in various other forms (e.g., a wheel scroll button, a wheel dial member or a crown) that may be included in the wearable device 101. The rotation input device 120 may be rotated clockwise or counterclockwise, and a variety of rotation input information may be defined depending on the rotation amount, rotation speed or rotation direction of the rotation input device 120.

Figure 2A:
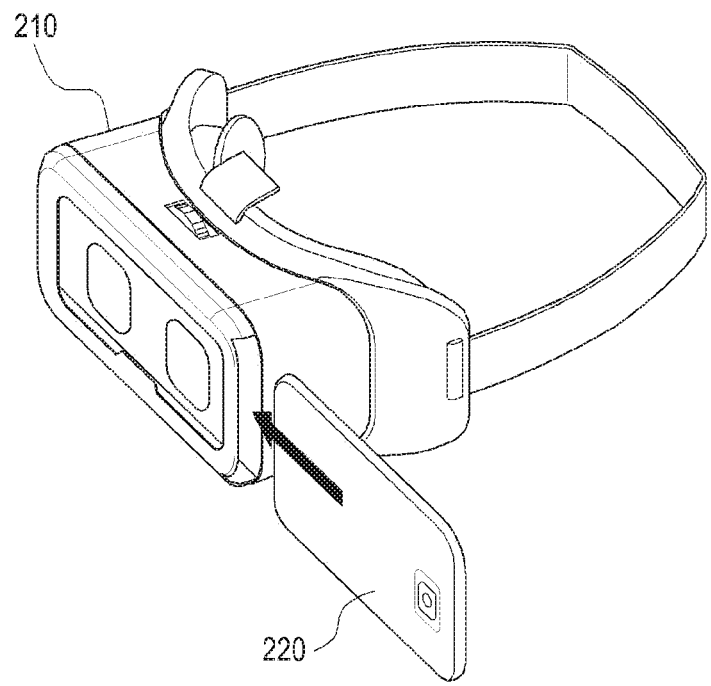
FIGS. 2A and 2B illustrate a wearable device according to an embodiment of the present disclosure.
Figure 2B:
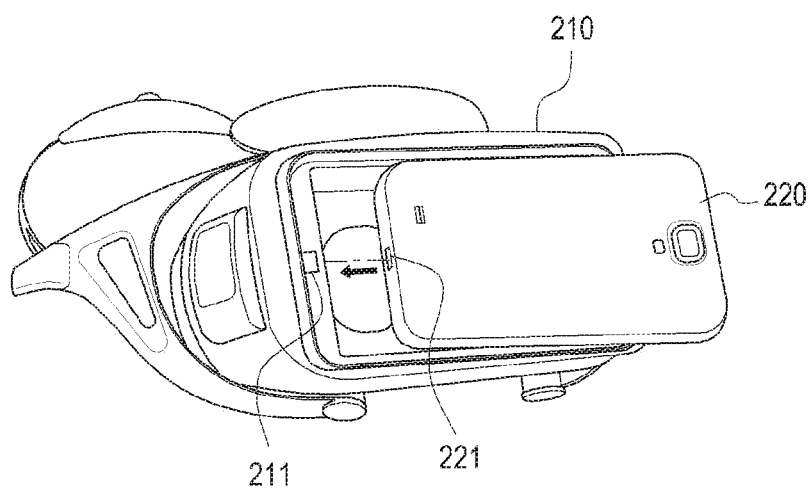

FIGS. 2A and 2B illustrate a wearable device according to an embodiment of the present disclosure.

According to an embodiment of the present disclosure, a wearable device 210 may be, for example, the electronic device 100 in FIG. 1, and may be configured to include a body and a cover. Further, the wearable device 210 may provide only the function of a cradle for a specific electronic device without the communication function as described above.

Referring to FIG. 2A, in a case where an electronic device 220 is mounted on the wearable device 210, a cover for fixing the rear edge of the electronic device 220 to the wearable device 210 may be provided so that the electronic device 220 may be securely mounted. The wearable device 210 may include a support with which the user may wear the wearable device 210 on his/her head.

Further, the wearable device 210 may include lenses disposed in the positions corresponding to both eyes of the wearer. The wearer may view a screen of the display of the electronic device 220 through the lenses in the state where the electronic device 220 is mounted on the wearable device 210. The wearable device 210 may have a mechanical structure in which the electronic device 220 may be detachably mounted as shown in FIGS. 2A and 2B.

According to an embodiment of the present disclosure, the wearable device 210 may include at least one of a touch panel, a button, a wheel key, a touchpad and the like. The touch panel may receive a user's touch input. The touch input may include an input that is made when the user directly touches the touch panel, or a hovering input that is made when the user is close to the touch panel. When the electronic device 220 is mounted thereon, the wearable device 210 may be connected to the electronic device 220 through an interface such as a universal serial bus (USB) to perform communication with the electronic device 220.

The wearable device 210 may control a function corresponding to the input in response to the rotation input information received from the wearable device 101. For example, the wearable device 210 may control the settings (e.g., the display's brightness or resolution) related to the screen (e.g., a video playback screen of an HMD mode) displayed on the display of the electronic device 220 or may control the movement of an indication object, in response to the rotation input information.

Referring to FIG. 2B, when the electronic device 220 is mounted on the wearable device 210, an external device connector 221 of the electronic device 220 may be electrically connected to a connector 211 of the wearable device 210, for communication between the devices.

Figure 3A:
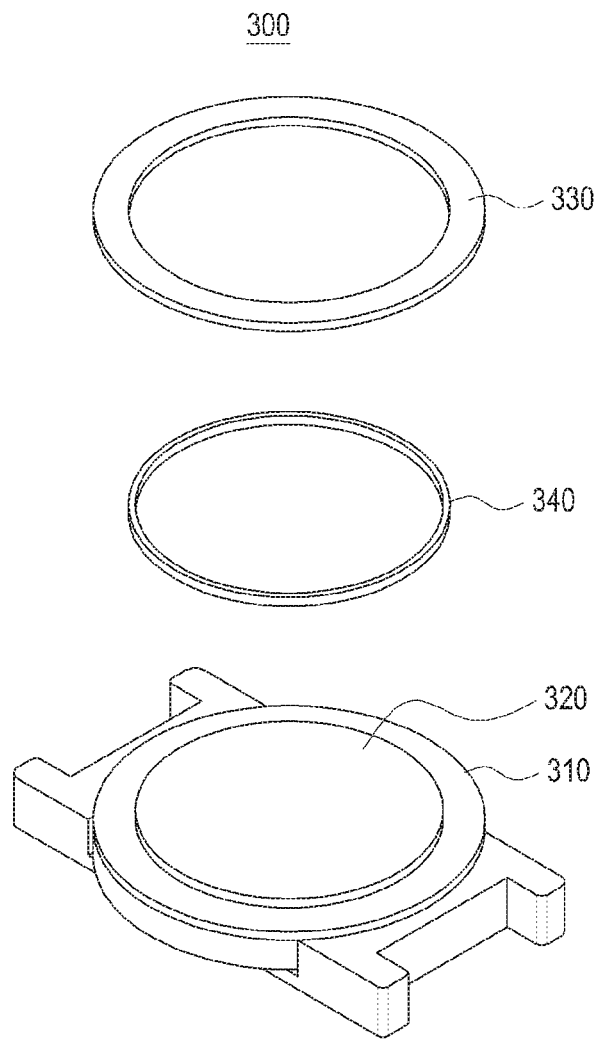
FIG. 3A is an exploded perspective view of an external electronic device according to an embodiment of the present disclosure.

FIG. 3A is an exploded perspective view of an external electronic device according to an embodiment of the present disclosure.

Referring to FIG. 3A, an external electronic device 300 includes a housing 310, a circular display 320, a wheel dial member 330 (or a rotation input device) with a ring-like structure, and a wheel dial fixing member 340 with a binding structure.

According to an embodiment of the present disclosure, when the wheel dial member 330 is rotated, holes formed in the lower surface of the wheel dial member 330 are also rotated, so an insertion member may contact with the surface in which the holes are not formed, at the lower surface of the wheel dial member 330. If the insertion member is inserted into the holes formed in the lower surface of the wheel dial member 330 while contacting with the surface in which the holes are not formed, the user may feel a click according to the rotation of the wheel dial member 330.

Figure 3B:
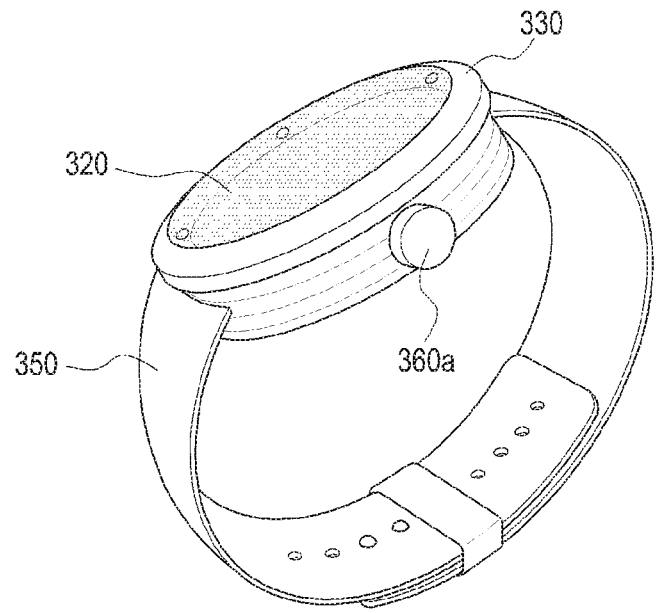
FIGS. 3B and 3C are diagrams schematically illustrating a watch-type external electronic device according to an embodiment of the present disclosure.
Figure 3C:
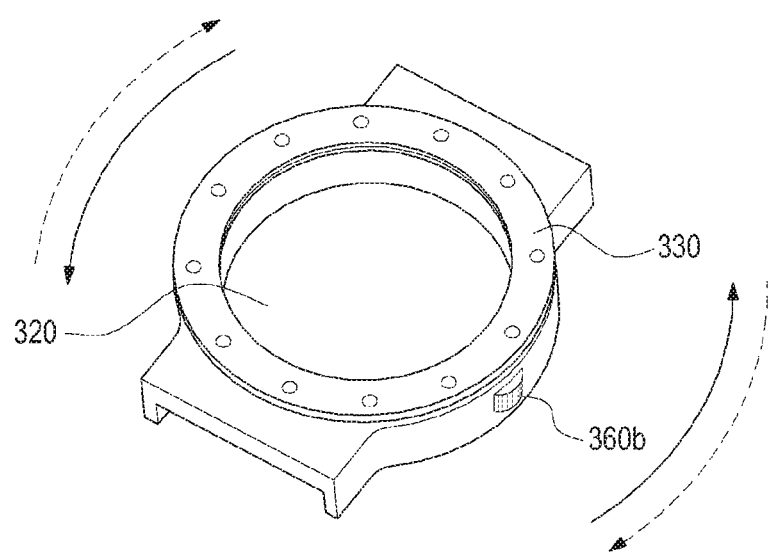

FIGS. 3B and 3C are diagrams schematically illustrating a watch-type external electronic device according to an embodiment of the present disclosure.

Referring to FIG. 3B, the external electronic device 300 includes a body and a band (or a strap) 350 for securing the body to the user's wrist, and the body includes the touch screen 320, the wheel dial member 330 and a crown 360a.

According to an embodiment of the present disclosure, it is assumed herein that the external electronic device 300 is a watch-type electronic device, but the external electronic device 300 is not limited thereto, and the external electronic device 300 may include various types (e.g., necklaces) of electronic devices (e.g., smart phones, wearable devices) with the wheel dial member 330.

The touch screen 320 may include a touch panel for sensing a touch input, and may sense a user input (e.g., a touch input or a hovering input).

The wheel dial member 330 is a user interface that may be rotated and is disposed around the touch screen 320, and configured to control the display the electronic device 100 that communicates with the external electronic device 300. For example, display of an object on the display of the electronic device 100 may be controlled depending on the rotation amount, the rotation direction or the rotation speed of the wheel dial member 330.

The crown 360a is fixed to one end of the crown rotation axis, and the crown 360a may rotate about the crown rotation axis, and move forward or backward in the longitudinal direction of the crown rotation axis.

According to an embodiment of the present disclosure, an object displayed on the display of the electronic device 100 may be controlled in response to the rotation (or the rotation about the crown rotation axis) of the crown 360a. For example, if the crown 360a is moved forward and rotated in a first direction, the display may be controlled such that a first object displayed on the electronic device 100 moves in a direction corresponding to the first direction. If the crown 360a is moved backward and rotated in a second direction, the display may be controlled such that a pointer object pointing to a specific object moves in a direction corresponding to the second direction.

Referring to FIG. 3C, the external electronic device 300 may include the ring-type wheel dial member 330 that is formed along the circumference of the touch screen 320 and may be physically rotated, and a wheel scroll button 360b that is disposed to have the scroll up/down structure like the wheel of a mouse input device. For example, the wheel dial member 330 may be rotated in units of a predetermined rotation angle so that the user may feel a click while rotating the wheel.

According to an embodiment of the present disclosure, the external electronic device 300 may detect a scroll direction input entered through the wheel scroll button 360b as an input for controlling an object displayed on the display of the electronic device 100. For example, it is assumed herein that the wheel scroll button 360b is disposed at the center of the side of the body, but the wheel scroll button 360b may be disposed in various other locations where the user may manipulate the wheel scroll button 360b with the finger.

Figures 4, 5:
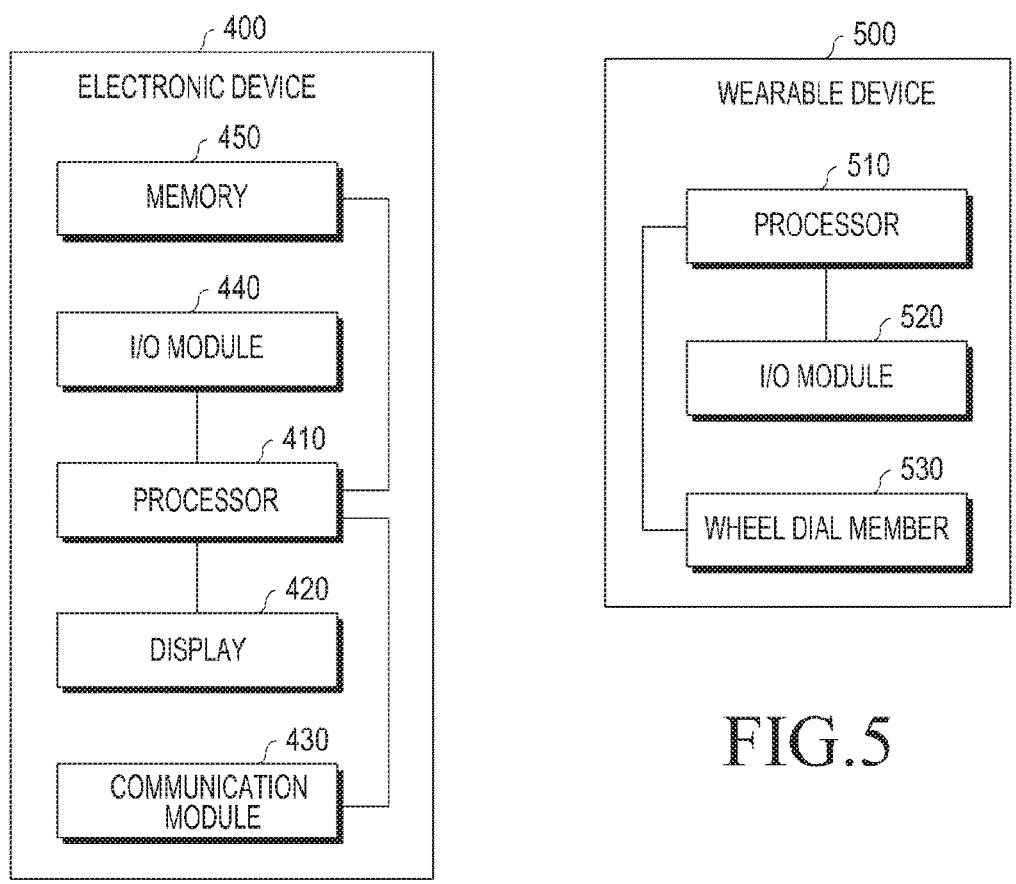
FIG. 4 is a block diagram of an electronic device according to an embodiment of the present disclosure.
FIG. 5 is a block diagram of a wearable device according to an embodiment of the present disclosure.

FIG. 4 is a block diagram of an electronic device according to an embodiment of the present disclosure.

Referring to FIG. 4, an electronic device 400 includes a processor 410, a display 420, a communication module 430, an input/output module 440, and a memory 450.

According to an embodiment of the present disclosure, the electronic device 400 may be configured as a wearable device that is attachable and detachable to/from the user's face, or may be configured to be inserted into the external electronic device that provides only the cradle function.

The processor 410 may perform the overall operation of the electronic device 400. For example, the processor 410 may receive rotation input information from at least one external electronic device, and process the received rotation input information for controlling an object displayed on the display 420. For example, the rotation input information may indicate the rotation direction, the rotation speed or the rotation amount entered through various rotation input devices (e.g., the rotatable bezel, the wheel dial member 330, the crown 360a or the wheel scroll button 360b).

The display 420 may display an execution screen of at least one application as a virtual reality screen. For example, the execution screen may include at least one list or menu, and if the list is selected, an indication object corresponding to at least one item may be displayed, and the menu, as an execution button, may control the electronic device 400 to perform a specific function.

According to an embodiment of the present disclosure, the user may set a motion angle of the electronic device 400 to place a pointer object on an object that the user desires to select, and may select the object through the touch screen included in the display 420, or the button included in the electronic device 400.

According to an embodiment of the present disclosure, an object is a mark that is output through a stereoscopic image on the display, and if a specific object is superimposed on the pointer object, a predetermined operation may be performed for the selected object in the electronic device.

According to an embodiment of the present disclosure, the pointer object is an indicator object for indicating a specific object, and the pointer object may be displayed on the display as an object itself, based on the movement of the electronic device, the user or other input means. Further, the pointer object may be transparently displayed, and may be controlled such that the object overlapping with the pointer object may be visually highlighted.

The communication module 430 may perform communication with at least one external electronic device. For example, the communication module 430 may discover an external electronic device that is located within a predetermined distance from the electronic device 400, and receive rotation input information from the discovered external electronic device.

The input/output module 440 may detect a variety of information for controlling an object displayed on the display 420. For example, the input/output module 440 may include a touchpad or a sensor (e.g., a gyro sensor or an acceleration sensor), and may detect a motion angle of the electronic device 400, or detect a selection input for a specific indication object.

According to an embodiment of the present disclosure, the input/output module 440 may process a variety of information processed in the electronic device 400 as a variety of data (e.g., sounds, images, lights or vibrations), and output the processed information to the outside. For example, the information may indicate the detection or connection of at least one external electronic device including a rotation input device (e.g., a bezel, a wheel dial member, a wheel scroll button or a crown), or indicate that at least one object displayed on the display 420 is selected, deleted or moved by the connected at least one external electronic device.

The memory 450 may store information for detecting or connecting at least one electronic device including the rotation input device, or information for selecting, deleting or moving at least one object displayed on the display 420 by the connected at least one external electronic device.

For example, the electronic device 400 according to an embodiment of the present disclosure may include a housing, a display unit 420 exposed to the housing, a communication module 430 disposed inside the housing, a processor 410 disposed inside the housing and electrically connected to the communication module, and a memory 450 electrically connected to the processor. The memory may store instructions, which when executed by the processor, cause the electronic device to receive, from a first external electronic device, rotation input information entered by rotation of a rotation input device included in the first external device though the communication module, and control an object displayed on the display unit based on the received rotation input information.

The rotation input information according to an embodiment of the present disclosure may include information about a rotation direction, a rotation speed or a rotation amount of the rotation input device for a predetermined time.

The instructions, when executed by the processor, cause the electronic device to display an execution screen of a first application on the display unit, and display a list of applications including the first application, upon receiving from the first external device, first rotation input information indicating a rotation at a first rotation speed greater than or equal to a predetermined value. The list of applications may include at least one application that has been executed in the electronic device for a predetermined time.

The instructions, when executed by the processor, cause the electronic device to receive second rotation input information from the first external device while the list of applications is displayed, and output an execution screen of a second application corresponding to the second rotation input information among the at least one application.

The instructions, when executed by the processor, cause the electronic device to display a screen related to first content among at least one content on the display unit, receive, from the first external device, third rotation input information indicating a rotation with a third rotation amount at a third rotation speed less than or equal to a predetermined value, and display a screen related to second content corresponding to the third rotation amount among the at least one content.

The instructions, when executed by the processor, cause the electronic device to display a user authentication screen on the display unit, identify a second external device transmitting identification information in a predetermined format among at least one external device, and perform authentication on a second user corresponding to the second external device based on rotation input information received from the second external device.

The instructions, when executed by the processor, cause the electronic device to control at least one dial for entering a password of at least one digit to be displayed on the user authentication screen, and identify a first dial corresponding to fourth rotation input information received from the second external device among the at least one dial.

The instructions, when executed by the processor, cause the electronic device to upon identifying the first dial, receive fifth rotation input information from the second external device, and rotate and display the first dial in response to the fifth rotation input information.

The instructions, when executed by the processor, cause the electronic device to receive, from the first external device, sixth rotation input information including a sixth rotation speed corresponding to a predetermined value, and change settings related to the display unit, which correspond to a value of the sixth rotation speed.

The instructions, when executed by the processor, cause the electronic device to after receiving the sixth rotation input information, identify seventh rotation input information received from the first external device, and change a setting value related to the display unit based on the seventh rotation input information. The settings related to the display unit may include settings for a brightness of the display unit, and a size or a resolution of an output screen.

FIG. 5 is a block diagram of a wearable device according to an embodiment of the present disclosure.

Referring to FIG. 5, a wearable device 500 includes a processor 510, an input/output module 520 and a wheel dial member 530.

The processor 510 may perform the overall operation of the wearable device 500. For example, the processor 510 may identify or check rotation input information entered through a rotation input device (e.g., the wheel dial member 530), convert the rotation input information into the information that may be processed in an external electronic device, and transmit the converted information to the electronic device.

The input/output module 520 may output the data processed in the wearable device 500 to the outside, or convert the information received from the outside into the data that may be processed in the wearable device 500.

According to an embodiment of the present disclosure, the input/output module 520 may perform short-range communication with at least one external electronic device, and transmit the rotation input information to the at least one external electronic device.

The wheel dial member 530 may be rotated clockwise or counterclockwise by the user's manipulation, and may be configured in various types (e.g., a wheel scroll button, a crown, a rotatable bezel and the like) to detect the rotation input information.

Figure 6:
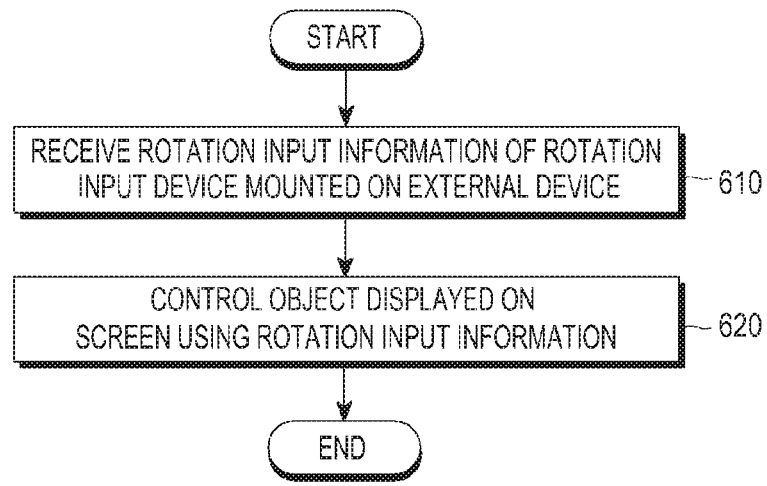
FIG. 6 is a flowchart of an operation of controlling a display by receiving rotation input information from an external electronic device in an electronic device according to an embodiment of the present disclosure.

FIG. 6 is a flowchart of an operation of controlling a display by receiving rotation input information from an external electronic device in an electronic device according to an embodiment of the present disclosure.

Referring to FIG. 6, in step 610, the electronic device receives rotation input information entered with a rotation input device of the external electronic device from the external electronic device. For example, the external electronic device may include a wearable device that is connected to the electronic device through short-range communication (e.g., WiFi or Bluetooth).

In step 620, the electronic device controls an object displayed on a screen using the received rotation input information. For example, the rotation input information may include information about the rotation speed, the rotation amount or the rotation direction.

According to an embodiment of the present disclosure, an electronic device may move an indication object or a pointer object based on the rotation amount or the rotation direction included in the rotation input information, or to perform a specific operation (e.g., a list displaying operation) based on the rotation speed.

For example, a screen control method of an electronic device according to an embodiment of the present disclosure may include receiving, from a first external device, rotation input information entered by rotation of a rotation input device included in the first external device, and control an object displayed on a display unit based on the received rotation input information.

The rotation input information according to an embodiment of the present disclosure may include information about a rotation direction, a rotation speed or a rotation amount of the rotation input device for a predetermined time.

The screen control method of the electronic device according to an embodiment of the present disclosure may further include displaying an execution screen of a first application on the display unit, and displaying a list of applications including the first application, upon receiving, from the first external device, first rotation input information indicating a rotation at a first rotation speed greater than or equal to a predetermined value. The list of applications may include at least one application that has been executed in the electronic device for a predetermined time.

The screen control method of the electronic device according to an embodiment of the present disclosure may further include receiving second rotation input information from the first external device while the list of applications is displayed, and outputting an execution screen of a second application corresponding to the second rotation input information among the at least one application.

The screen control method of the electronic device according to an embodiment of the present disclosure may further include displaying a screen related to first content among at least one content on the display unit, receiving, from the first external device, third rotation input information indicating a rotation with a third rotation amount at a third rotation speed less than or equal to a predetermined value, and displaying a screen related to second content corresponding to the third rotation amount among the at least one content.

The screen control method of the electronic device according to an embodiment of the present disclosure may further include displaying a user authentication screen on the display unit, identifying a second external device transmitting identification information in a predetermined format among at least one external device, and performing authentication on a second user corresponding to the second external device based on rotation input information received from the second external device.

The screen control method of the electronic device according to an embodiment of the present disclosure may further include displaying at least one dial for entering a password of at least one digit on the user authentication screen, and identifying a first dial corresponding to fourth rotation input information received from the second external device among the at least one dial.

The screen control method of the electronic device according to an embodiment of the present disclosure may further include, upon identifying the first dial, receiving fifth rotation input information from the second external device, and rotating and displaying the first dial in response to the fifth rotation input information.

The screen control method of the electronic device according to an embodiment of the present disclosure may further include receiving, from the first external device, sixth rotation input information including a sixth rotation speed corresponding to a predetermined value, changing settings related to the display unit, which correspond to a value of the sixth rotation speed.

The screen control method of the electronic device according to an embodiment of the present disclosure may further include, after receiving the sixth rotation input information, identifying seventh rotation input information received from the first external device, and changing a setting value related to the display unit based on the seventh rotation input information. The settings related to the display unit may include settings for a brightness of the display unit, and a size or a resolution of an output screen.

Figure 7:
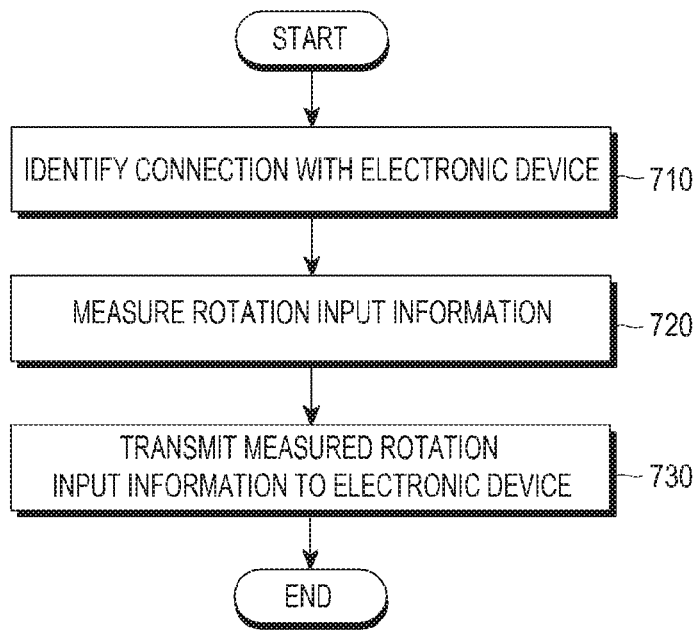
FIG. 7 is a flowchart of an operation of controlling a display of an electronic device in an external electronic device according to an embodiment of the present disclosure.

FIG. 7 is a flowchart of an operation of controlling a display of an electronic device in an external electronic device according to an embodiment of the present disclosure.

Referring to FIG. 7, in step 710, an external electronic device determines or identifies its connection to at least one electronic device. For example, as the external electronic device is discovered by the electronic device as a device capable of short-range communication, a communication connection may be established (such as Bluetooth pairing) with the electronic device, for transmission/reception of communication data.

In step 720, the external electronic device measures rotation input information through a rotation input device included in the external electronic device. For example, the rotation input information may include information about the rotation direction, the rotation speed or the rotation amount that has been detected for a predetermined time from various rotation input devices (e.g., a rotatable bezel, a wheel dial member, a crown, a wheel scroll button and the like) that may be included in the external electronic device.

In step 730, the external electronic device transmits the measured rotation input information to the electronic device.

Figure 8A:
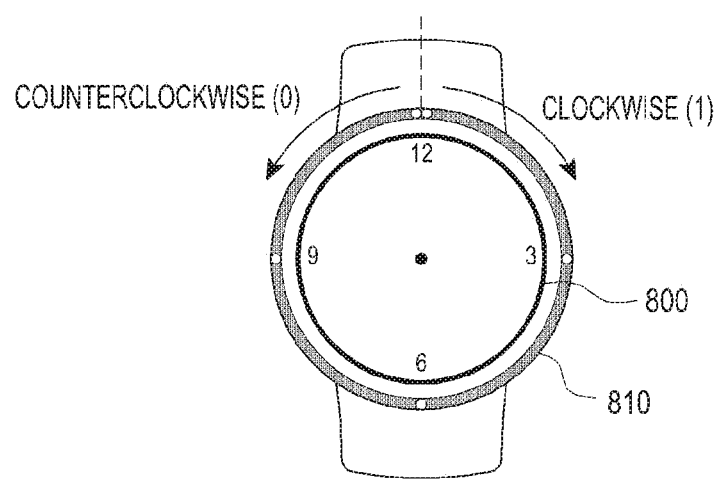
FIGS. 8A and 8B illustrate rotation input information in an external electronic device according to an embodiment of the present disclosure.
Figure 8B:
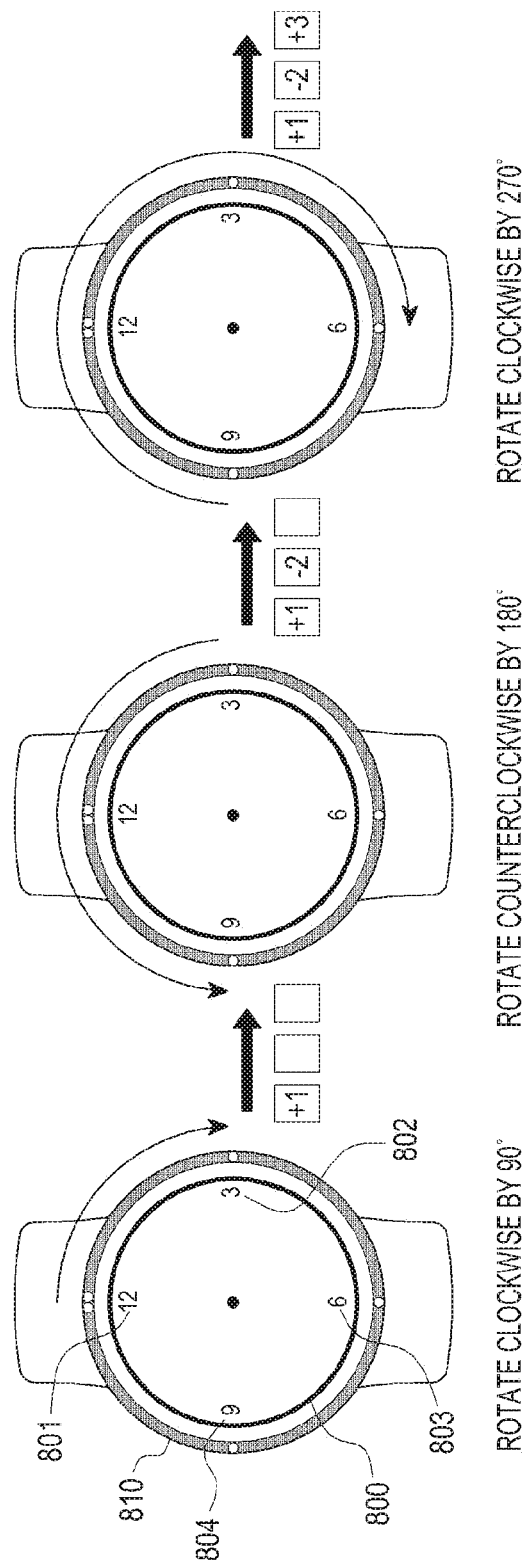

FIGS. 8A and 8B illustrate rotation input information in an external electronic device according to an embodiment of the present disclosure.

According to an embodiment of the present disclosure, an external electronic device 800 (e.g., a wearable device) includes a rotation input device 810, and the rotation input device 810 may be configured in the form of a bezel or a wheel dial member.

Referring to FIG. 8A, the rotation input device 810 may be rotated clockwise or counterclockwise. For example, the external electronic device 800 may define the rotation input information as a value of '1', if the rotation input device 810 is rotated clockwise, and define the rotation input information as a value of '0', if the rotation input device 810 is rotated counterclockwise.

Referring to FIG. 8B, the rotation input device 810 of the external electronic device 800 (e.g., a wearable device) may be rotated clockwise or counterclockwise, and may measure the rotation amount (e.g., 0°, 90° 180° or 270°) from a specific point (e.g., first to fourth points 801 to 804).

According to an embodiment of the present disclosure, the external electronic device 800 may define the rotation input information as a value of "+1", if the rotation input device 810 is rotated clockwise by 90° from the first point 801. The external electronic device 800 may define the rotation input information as a value of "−2", if the rotation input device 810 is rotated counterclockwise by 180° from the second point 802. The external electronic device 800 may define the rotation input information as a value of "+3", if the rotation input device 810 is rotated clockwise by 270° from the fourth point 804.

Figure 8C:
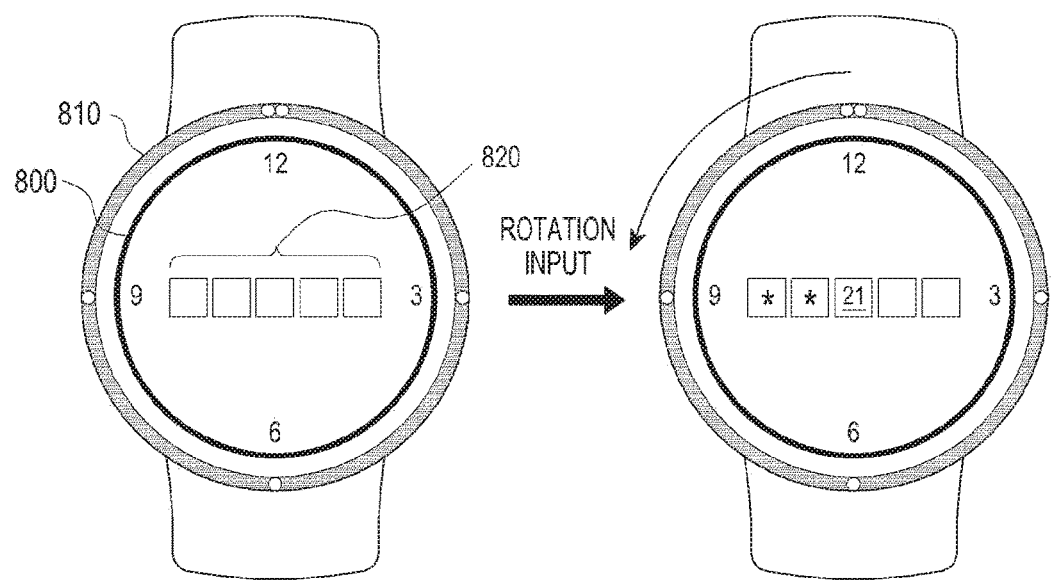
FIG. 8C illustrates an operation of displaying measured rotation input information on an external electronic device according to an embodiment of the present disclosure.

FIG. 8C illustrates an operation of displaying measured rotation input information on an external electronic device according to an embodiment of the present disclosure.

Referring to FIG. 8C, the external electronic device 800 includes the rotation input device 810 and a display, and the rotation input information measured by the rotation input device 810 may be displayed on a portion 820 of the display of the electronic device 800.

According to an embodiment of the present disclosure, the external electronic device 800 may perform an operation of moving the cursor, displaying the rotation input information or authenticating the user by identifying a rotation speed, a rotation amount or a rotation direction in the rotation input information measured through the rotation input device 810. For example, if first rotation input information is measured as a first direction, a first rotation amount and a first rotation speed greater than or equal to a predetermined value, the external electronic device 800 may move the cursor from the current cursor position by the first rotation amount in the direction corresponding to the first direction, and display the moved cursor.

According to an embodiment of the present disclosure, when second rotation input information is measured in the external electronic device 800, in a case where the second rotation input information is measured as a second direction, a second rotation amount and a second rotation speed less than or equal to a predetermined value, a character corresponding to the second direction and the second rotation amount may be displayed. For example, the external electronic device 800 may determine or identify a number (e.g., "21") corresponding to the second direction and the second rotation amount, and display the identified character in the current cursor position.

According to an embodiment of the present disclosure, when third rotation input information is measured, the external electronic device 800 may determine at least one rotation input information entered for a predetermined time, as password information, and perform a user authentication operation. For example, the external electronic device 800 may compare the entered password information with the pre-stored user authentication information, to determine whether the password information is valid information.

According to an embodiment of the present disclosure, the type of the rotation input information entered in the external electronic device 800 is assumed to be a number, but is not limited thereto, and the rotation input information may be defined by various types (e.g., letters or symbols) based on the rotation direction, the rotation speed and the rotation amount.

Figure 9:
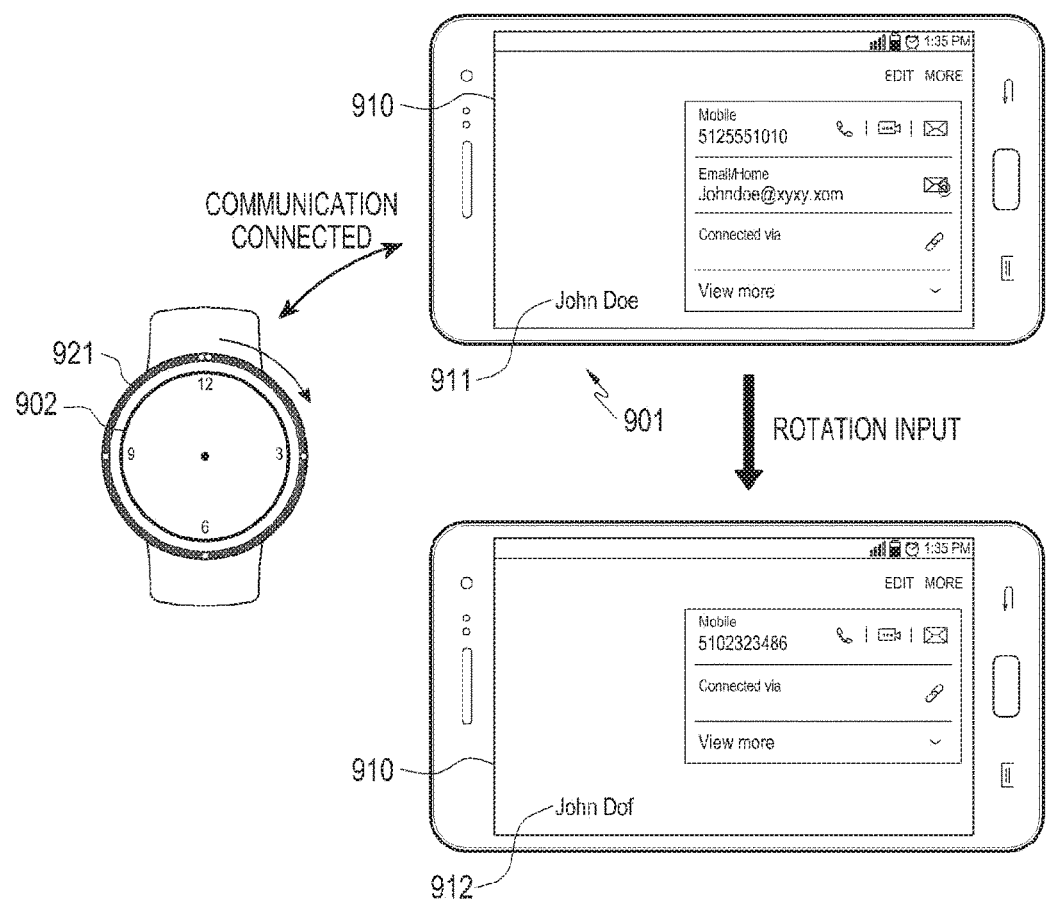
FIG. 9 illustrates an operation of controlling a display of an electronic device based on rotation input information according to an embodiment of the present disclosure.

FIG. 9 illustrates an operation of controlling a display of an electronic device based on rotation input information according to an embodiment of the present disclosure.

Referring to FIG. 9, an electronic device 901 may establish a communication connection with an external wearable device 902. For example, the wearable device 902 may include a bezel-type rotation input device 921 as a watch-type device.

According to an embodiment of the present disclosure, in the electronic device 901, a contact application may be executed and an execution screen 910 of the contact application may be displayed. For example, the electronic device 901 may receive rotation input information entered through the rotation input device 921 from the wearable device 902, and replace information about the user (e.g., "John Doe" 911) displayed on the execution screen 910 with information about another user (e.g., "John Dof" 912) based on the rotation input information.

According to an embodiment of the present disclosure, as the rotation input information received from the wearable device 902 indicates a rotation in a specific direction (e.g., right), the electronic device 901 may replace the currently displayed contact information of "John Doe" 911 with contact information of the next user "John Dof" 912 corresponding to the rotation direction. For example, "John Dof" 912 may be arranged in the next order of "John Doe" 911 in alphabetical order.

According to an embodiment of the present disclosure, the user information is assumed to be sorted in alphabetical order, but the user information may be sorted based on the time that the contact information was stored or updated, or the time that the contact information was read by the user. The electronic device 901 may control to display the specified user's contact information among the contact information based on a variety of information indicated by the rotation input information.

Figure 10:
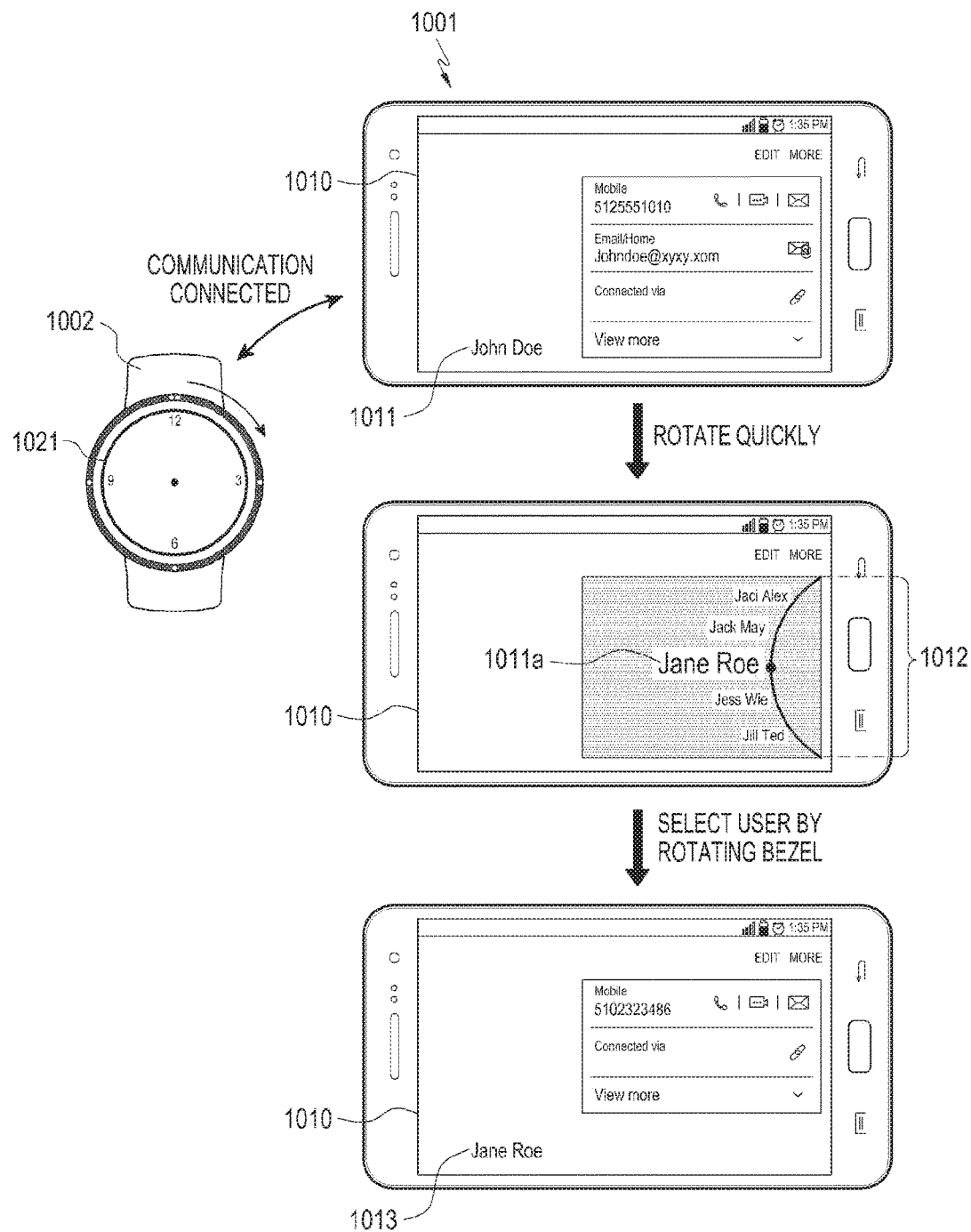
FIG. 10 illustrates an operation of controlling a display of an electronic device based on rotation input information according to another embodiment of the present disclosure.

FIG. 10 is illustrates an operation of controlling a display of an electronic device based on rotation input information according to an embodiment of the present disclosure.

Referring to FIG. 10, an electronic device 1001 may establish a communication connection with an external wearable device 1002. For example, the wearable device 1002 may include a bezel-type rotation input device 1021 as a watch-type device.

According to an embodiment of the present disclosure, in the electronic device 1001, a contact application may be executed and an execution screen 1010 of the contact application may be displayed. For example, the electronic device 1001 may receive rotation input information entered through the rotation input device 1021 from the wearable device 1002, and display a contact list on the execution screen 1010 based on the rotation input information.

According to an embodiment of the present disclosure, as first rotation input information received from the wearable device 1002 indicates a rotation speed greater than or equal to a predetermined value, the electronic device 1001 may display a contact list 1012 including the currently displayed contact information of "John Doe" 1011.

According to an embodiment of the present disclosure, as second rotation input information, which is received from the wearable device 1002 while the contact list 1012 is displayed, indicates a rotation in a second direction with a second rotation amount, a user (e.g., "Jane Roe" 1011*a*) corresponding to the second direction and the second rotation amount may be selected from the contact list 1012. For example, contact information 1013 of the selected "Jane Roe" 1011*a* may be displayed on the electronic device 1001.

According to an embodiment of the present disclosure, the contact list is assumed to be displayed based on the speed of the rotation input, but the contact list 1012 including the currently displayed user's contact information may be displayed based on a variety of information indicated by the rotation input information.

Figure 11:
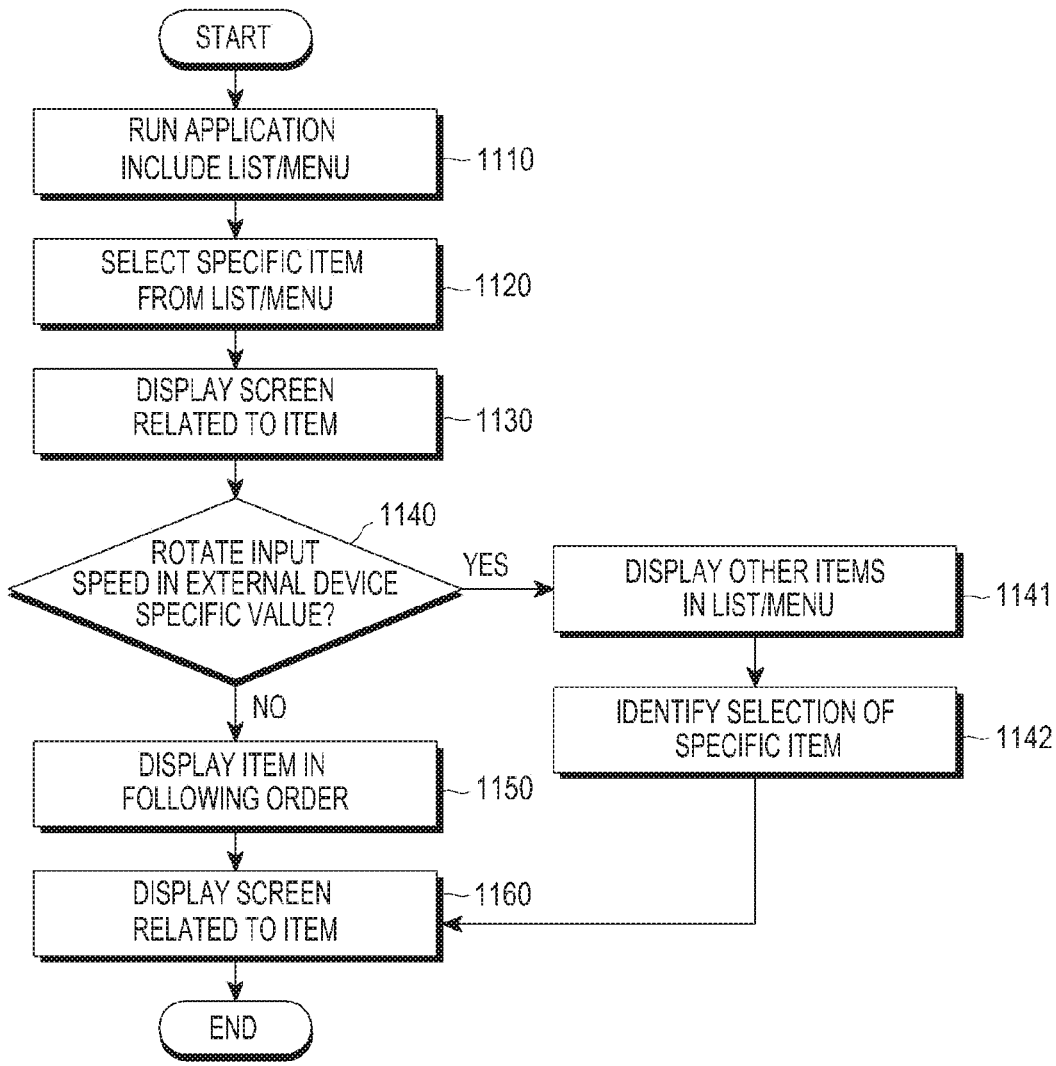
FIG. 11 is a flowchart of an operation of controlling a screen of an electronic device based on rotation input information received from an external electronic device according to an embodiment of the present disclosure.

FIG. 11 is a flowchart of an operation of controlling a screen of an electronic device based on rotation input information received from an external electronic device according to an embodiment of the present disclosure.

Referring to FIG. 11, in step 1110, an electronic device executes an application including a list or a menu. For example, the list may include various types of content such as contact information, multimedia content (images or music), text and the like, and the menu may include at least one control button for executing a specific function in the electronic device.

In step 1120, the electronic device identifies the selection of a specific item from among the list or the menu.

In step 1130, the electronic device displays a screen related to the selected item. For example. the screen may include an execution screen for executing specific content, or a screen indicating the execution of a specific function.

In step 1140, the electronic device receives rotation input information from an external electronic device, and determines whether a rotation input speed in the external electronic device is greater than or equal to a predetermined value.

If it is determined in step 1140 that the rotation input speed is greater than or equal to a predetermined value, the electronic device displays other items included in the list or the menu in step 1141. For example, the other items may include the content included in the list or menu in addition to the content displayed on the electronic device.

In step 1142, the electronic device identifies the selection of a specific item from among other items included in the displayed list or menu. For example, in a case where a pointer object points to a specific item for a predetermined time or a predetermined input (e.g., a touch input or a user gesture) for a specific item is detected through an input/output module (e.g., a touchpad) of the electronic device, the electronic device may identify the selection of the item.

According to an embodiment of the present disclosure, the user may indicate a specific item with a pointer object displayed on the screen by rotating the rotation input device of the external electronic device. If the pointer object points to a specific item for a predetermined time, the electronic device may determine that the item is selected.

If it is determined in step 1140 that the rotation input speed indicates a rotation input speed less than or equal to a specific value, the electronic device displays an item in the following order in step 1150. For example, the item in the following order may include the rotation amount indicated by the rotation input information or the content corresponding to the rotation direction in addition to the rotation input speed.

In step 1160, the electronic device displays a screen related to the item corresponding to the rotation amount or rotation direction or selected by the user. For example, the screen related to the item may include an execution screen for executing a function including information related to the item or corresponding to the item.

Figure 12:
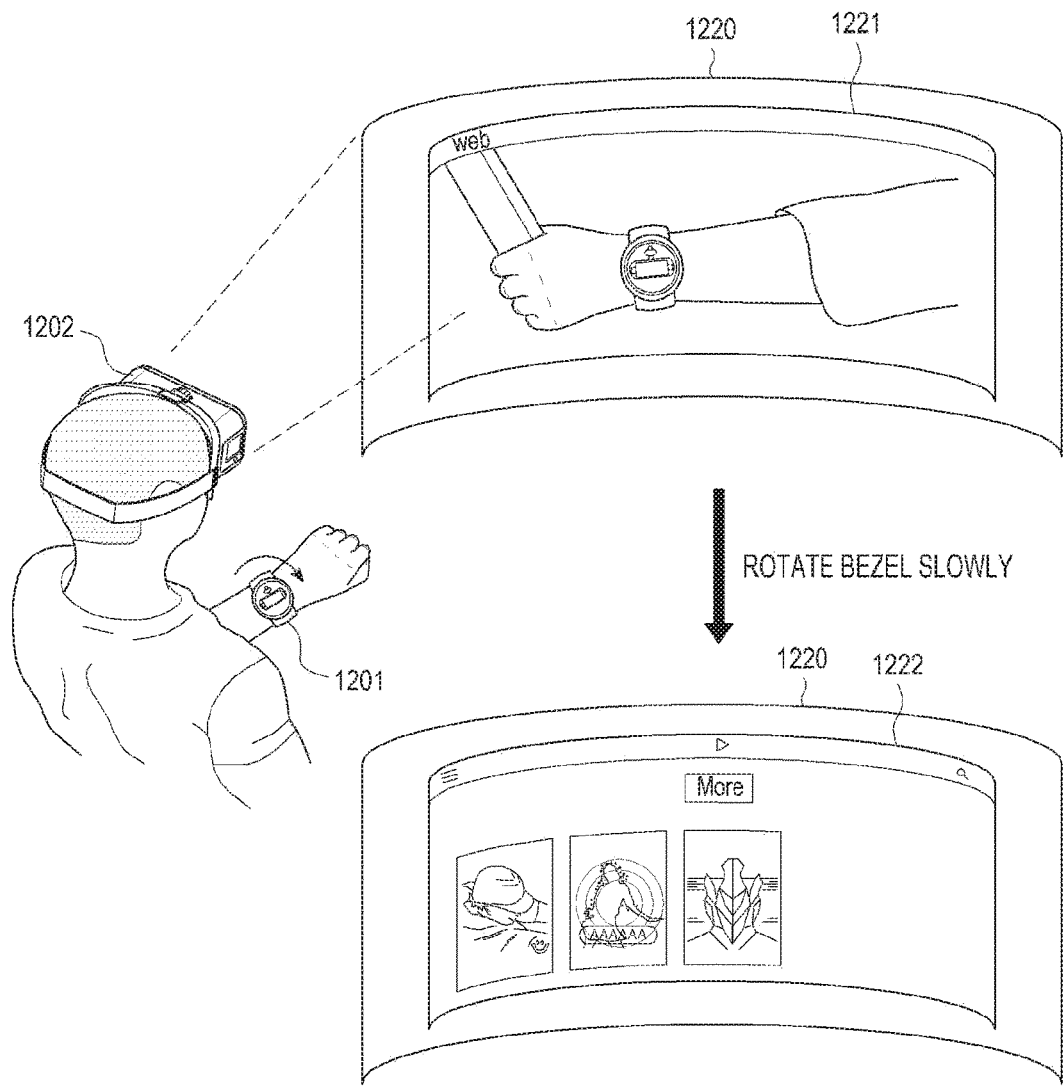
FIG. 12 illustrates an operation of controlling a screen of an electronic device based on rotation input information received from an external electronic device according to an embodiment of the present disclosure.

FIG. 12 illustrates an operation of controlling a screen of an electronic device based on rotation input information received from an external electronic device according to an embodiment of the present disclosure.

Referring to FIG. 12, an electronic device 1202 may be a face mounted wearable device, and may establish a communication connection with an external wearable device 1201. For example, the wearable device 1201 may include a bezel-type rotation input device as a watch-type device.

According to an embodiment of the present disclosure, when a multi-window function is executed in the electronic device 1202, a display 1220 of the electronic device 1202 may display an execution screen 1221 of at least one application that has been executed for a predetermined time. For example, the at least one application may include a web browser application or a media playback application.

According to an embodiment of the present disclosure, as the rotation input information received from the wearable device 1201 indicates a right rotation with a rotation speed less than or equal to a predetermined value, the electronic device 1202 may switch the currently displayed execution screen 1221 of the web browser application to another execution screen (e.g., an execution screen 1222 of a media playback application). For example, the media playback application, which is executed after the web browser application, may be selected and displayed in response to the rotation input information.

Figure 13:
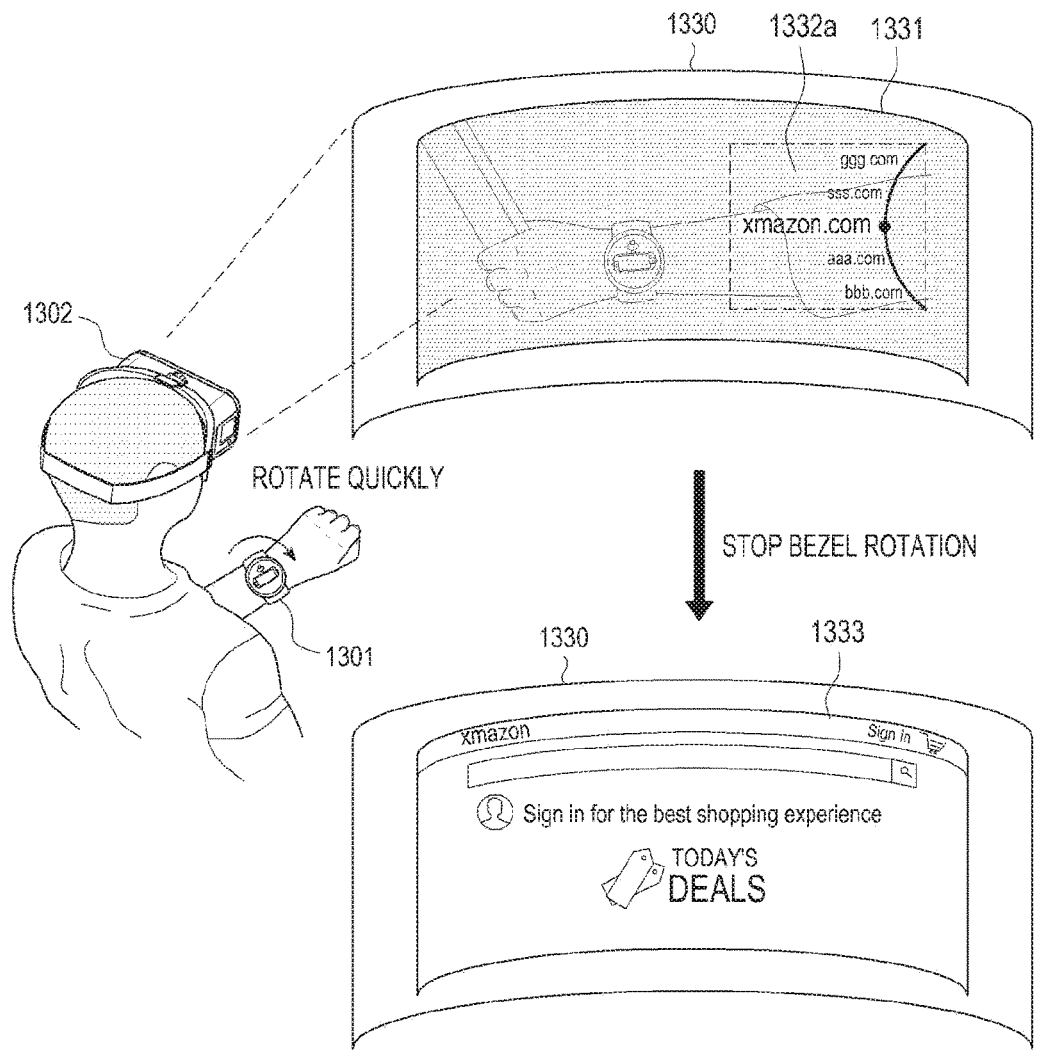
FIG. 13 illustrates an operation of controlling a screen of an electronic device based on rotation input information received from an external electronic device according to another embodiment of the present disclosure.

FIG. 13 illustrates an operation of controlling a screen of an electronic device based on rotation input information received from an external electronic device according to an embodiment of the present disclosure.

Referring to FIG. 13, an electronic device 1302 may be a face mounted wearable device, and may establish a communication connection with an external wearable device 1301. For example, the wearable device 1301 may include a bezel-type rotation input device as a watch-type device.

According to an embodiment of the present disclosure, if first rotation input information is received from the wearable device 1301 while a multi-window function is executed in the electronic device 1302, a display 1330 of the electronic device 1302 may display a list 1332*a* of other applications including the currently displayed execution screen 1331. For example, as the first rotation input information indicates a rotation at a first rotation speed greater than or equal to a predetermined value, the electronic device 1302 may display the list 1332*a*.

According to an embodiment of the present disclosure, based on second rotation input information that is received from the wearable device 1301 while displaying the list 1332*a*, the electronic device 1302 may identify the selection of a specific application (e.g., a web browser application) and display an execution screen 1333 of the application.

According to an embodiment of the present disclosure, the user may control the pointer object to point to an item "xmazon.com" through a rotation input device of the wearable device 1301, and may enter the second rotation input information (e.g., rotation stop). For example, if the rotation stop operation is kept for a predetermined time, the electronic device 1302 may identify the user's selection of the item "xmazon.com", and display the execution screen 1333 (e.g., a webpage of "xmazon.com") of the web browser application, which corresponds to the item "xmazon.com".

Figure 14:
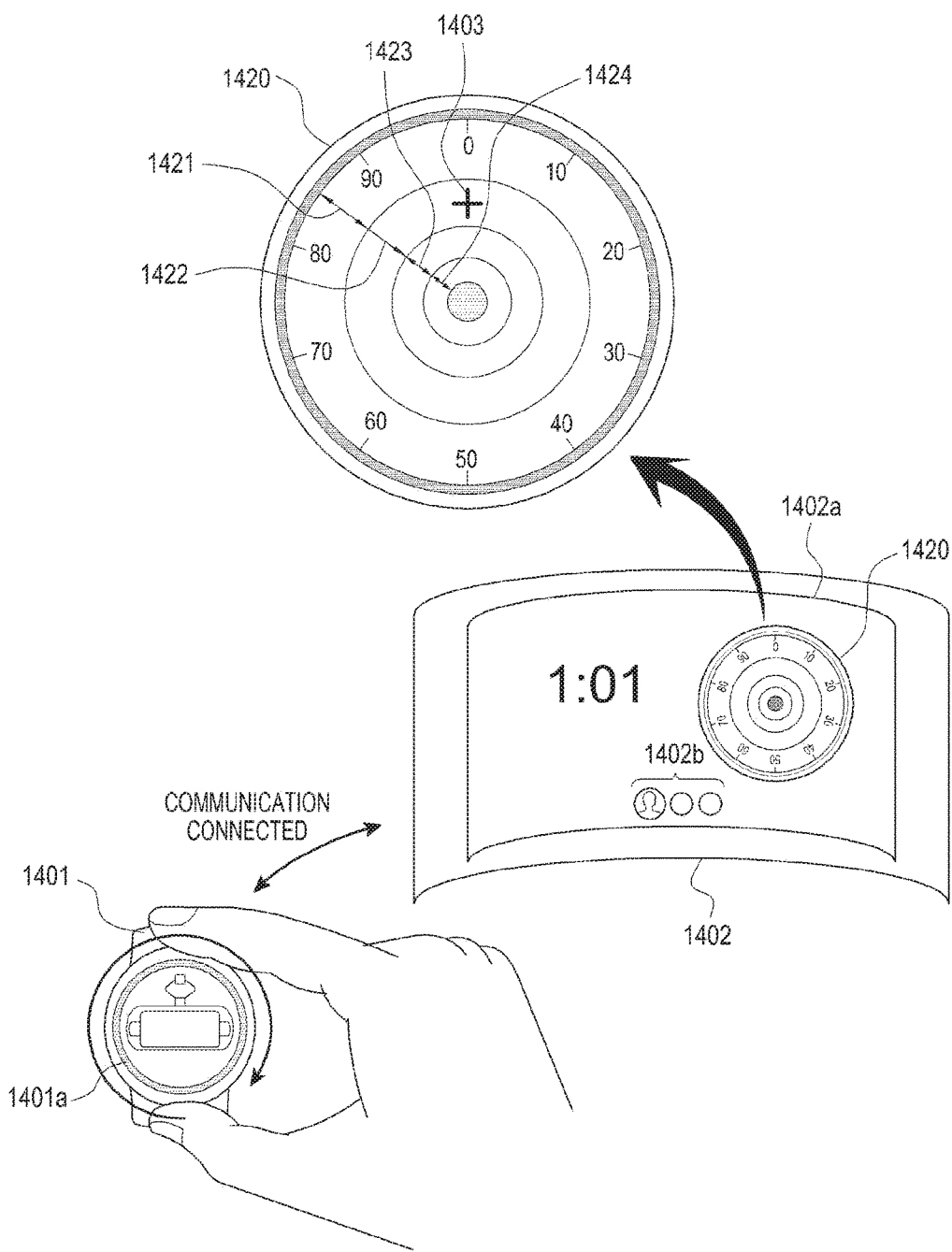
FIG. 14 illustrates an operation of controlling a user authentication screen based on rotation input information received from an external electronic device according to an embodiment of the present disclosure.

FIG. 14 illustrates an operation of controlling a user authentication screen based on rotation input information received from an external electronic device according to an embodiment of the present disclosure.

According to an embodiment of the present disclosure, an electronic device 1402 may be a face mounted wearable device with a display device, and establish a communication connection with an external wearable device 1401. For example, the wearable device 1401 may include a bezel-type rotation input device 1401*a* as a watch-type device.

Referring to FIG. 14, an authentication screen 1402*a* for user authentication may be displayed on the display of the electronic device 1402, and the electronic device 1402 may identify rotation input information received from the wearable device 1401 as user authentication information.

According to an embodiment of the present disclosure, the authentication screen 1402*a* may display a numeric dial 1420 for entering user authentication information in the form of a password, or a user identification item 1402*b*. For example, the user authentication information is not limited to the numeric password, and may be entered in a variety of forms (e.g., letters, symbols or biometric information). Accordingly, the authentication screen 1402*a* may include various interfaces for entering and displaying the user authentication information.

The numeric dial 1420 may include at least one numeric dial (first to fourth dials 1421 to 1424), and may include a pointer object 1403 for selecting and controlling one of the at least one numeric dial. For example, the pointer object 1403 may be moved based on the rotation input information measured through the rotation input device 1401*a* of the wearable device 1401.

In the electronic device 1402, the user identification item 1402*b* may include user information corresponding to at least one electronic device.

According to an embodiment of the present disclosure, the electronic device 1402 may enlarge the item for the user to be subject to authentication, which is included in the user identification item 1402*b*, and display the enlarged item. For example, the electronic device 1402 may identify the device (e.g., the wearable device 1401) transmitting identification information (e.g., medium access control (MAC) identification (ID)) or rotation input information, among the currently connected external electronic devices, and highlight the user's item of the identified device.

According to an embodiment of the present disclosure, if it is determined that the pointer object 1403 has been located in the area of a specific dial (e.g., the second dial 1422) for a first time, the electronic device 1402 may determine that the user will control the second dial 1422. For example, after elapse of the first time, the user may rotate the rotation input device 1401*a* of the wearable device 1401 to control the rotation direction or rotation amount of the second dial 1422.

According to an embodiment of the present disclosure, as four dials are included in the numeric dial 1420, the electronic device 1402 may identify a 4-digit password. The electronic device 1402 may identify a password entered through the numeric dial 1420 and determine whether the identified password matches the authentication information that is stored in advance for a specific user, thereby performing user authentication.

Figure 15:
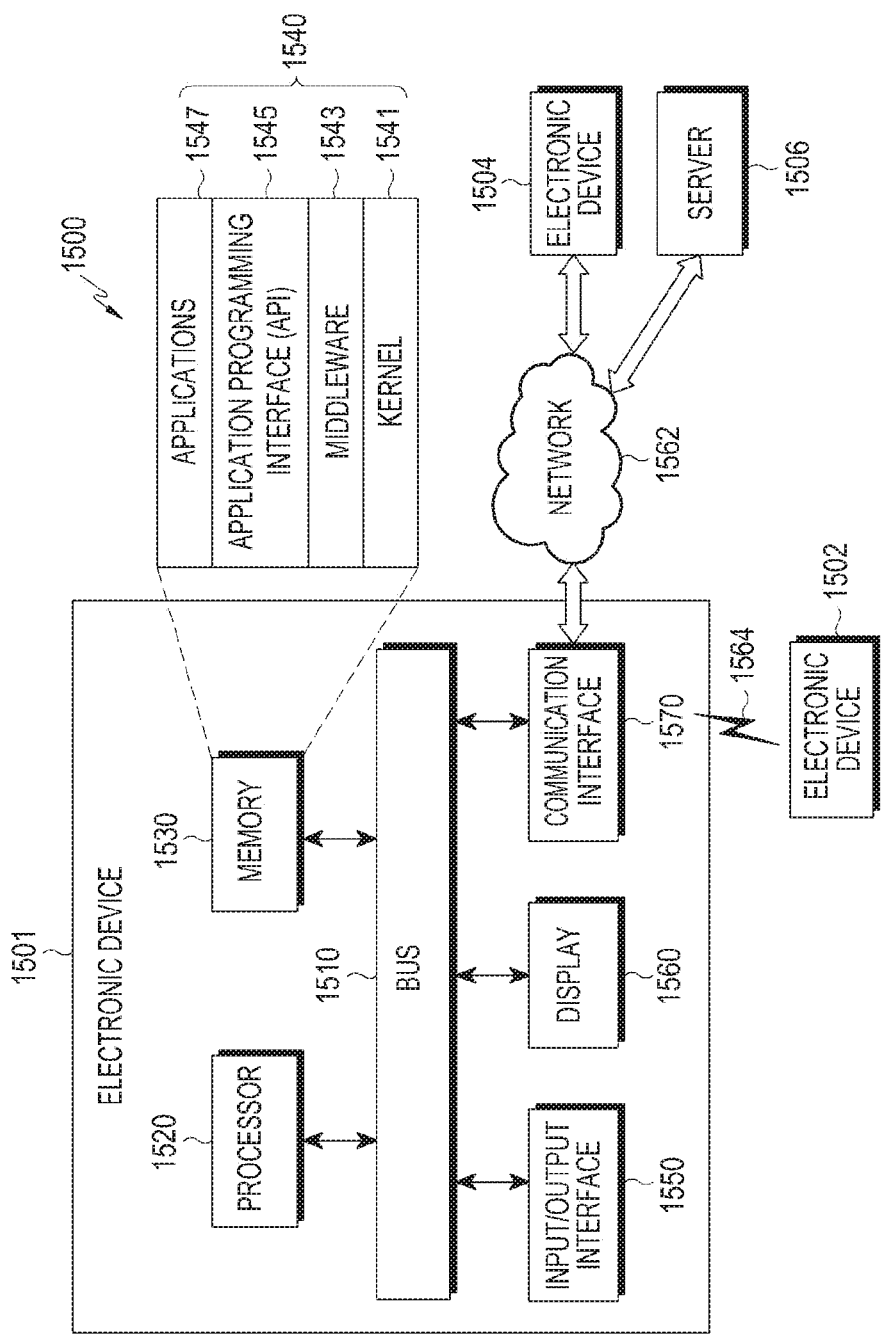
FIG. 15 illustrates an electronic device in a network environment according to an embodiment of the present disclosure.

FIG. 15 illustrates an electronic device in a network environment according to an embodiment of the present disclosure.

Referring to FIG. 15, an electronic device 1501 in a network environment 1500 is disclosed, and the electronic device 1501 includes a bus 1510, a processor 1520, a memory 1530, an input/output (I/O) interface 1550, a display 1560, and a communication interface 1570.

According to an embodiment of the present disclosure, the electronic device 1501 may omit at least one of the components, or may additionally include other components. The bus 1510 may include a circuit that connects the components 1510 to 1570 to each other, and transfers the communication (e.g., a control message and/or data) between the components 1510 to 1570. The processor 1520 may include one or more of a central processing unit (CPU), an application processor (AP) or a communication processor (CP). The processor 1520 may, for example, execute a control and/or communication-related operation or data processing for at least one other component of the electronic device 1501.

The memory 1530 may include a volatile and/or non-volatile memory. The memory 1530 may, for example, store a command or data related to at least one other component of the electronic device 1501. In an embodiment of the present disclosure, the memory 1530 stores software and/or a program 1540. The program 1540 includes, for example, a kernel 1541, a middleware 1543, an application programming interface (API) 1545, and/or an application program(s) (or "application") 1547. At least some of the kernel 1541, the middleware 1543 or the API 1545 may be referred to as an operating system (OS).

The kernel 1541 may, for example, control or manage the system resources (e.g., the bus 1510, the processor 1520, the memory 1530 and the like) that are used to execute the operation or function implemented in other programs (e.g., the middleware 1543, the API 1545, the application program 1547 or the like). Further, the kernel 1541 may provide an interface by which the middleware 1543, the API 1545 or the application program 1547 may control or manage the system resources by accessing the individual components of the electronic device 1501.

The middleware 1543 may, for example, perform an intermediary role so that the API 1545 or the application program 1547 may exchange data with the kernel 1541 by communicating with the kernel 1541. Further, the middleware 1543 may process one or more work requests received from the application program 1547 according to their priority. For example, the middleware 1543 may give a priority to use the system resources (e.g., the bus 1510, the processor 1520, the memory 1530 and the like) of the electronic device 1501, to at least one of the application programs 1547, and process the one or more work requests according to the priority. The API 1545 is, for example, an interface by which the application program 1547 controls the function provided in the kernel 1541 or the middleware 1543, and may include, for example, at least one interface or function (e.g., an instruction) for file control, window control, image processing or character control. The I/O interface 1550 may, for example, transfer a command or data received from the user or other external devices to the other components of the electronic device 1501, or output a command or data received from the other components of the electronic device 1501, to the user or other external devices.

The display 1560 may include, for example, a liquid crystal display (LCD) display, a light emitting diode (LED) display, an organic light emitting diode (OLED) display, a micro-electromechanical systems (MEMS) display, or an electronic paper display. The display 1560 may, for example, display a variety of content (e.g., texts, images, videos, icons, symbols or the like), for the user. The display 1560 may include a touch screen, and may receive a touch input, a gesture input, a proximity input or a hovering input made by, for example, an electronic pen or a part of the user's body. The communication interface 1570 may, for example, establish communication between the electronic device 1501 and a first external electronic device 1502, a second external electronic device 1504 or a server 1506. For example, the communication interface 1570 may communicate with the second external electronic device 1504 or the server 1506 by being connected to a network 1562 through wireless communication or wired communication.

The wireless communication may include cellular communication that uses at least one of, for example, long term evolution (LTE), long term evolution-advanced (LTE-A), code division multiple access (CDMA), wideband code division multiple access (WCDMA), universal mobile telecommunications system (UMTS), wireless broadband (WiBro) or global system for mobile communications (GSM), as a cellular communication protocol. In an embodiment of the present disclosure, the wireless communication may include at least one of, for example, wireless fidelity (WiFi), Bluetooth (BT), Bluetooth low energy (BLE), Zigbee, near field communication (NFC), magnetic secure transmission (MST), radio frequency (RF), or a body area network (BAN). The wireless communication may include GNSS, which may be, for example, global positioning system (GPS), global navigation satellite system (Glonass), navigation satellite system (Beidou or Galileo), or the European global satellite-based navigation system. Herein, the term "GPS" may be interchangeably used with the term "GNSS". The wired communication may include at least one of, for example, universal serial bus (USB), high definition multimedia interface (HDMI), recommended standard 232 (RS-232), power line communication or plain old telephone service (POTS). The network 1562 may include a telecommunications network, for example, at least one of the computer network (e.g., a local area network (LAN) or a wide area network (WAN)), the Internet, or the telephone network.

Each of the first and second external electronic devices 1502 and 1504 may be identical or non-identical in type to the electronic device 1501. All or some of the operations executed in the electronic device 1501 may be executed in the electronic devices 1502 and 1504 or the server 1506. In a case where the electronic device 1501 should perform a certain function or service automatically or upon request, the electronic device 1501 may send a request for at least some of the functions related thereto to the electronic devices 1502 and 1504 or the server 1506, instead of or in addition to spontaneously executing the function or service. The electronic devices 1502 and 1504 or the server 1506 may execute the requested function or additional function, and transfer the results to the electronic device 1501. The electronic device 1501 may process the received results intact or additionally, to provide the requested function or service. To this end, for example, the cloud computing, distributed computing, or client-server computing technology may be used.

Figure 16:
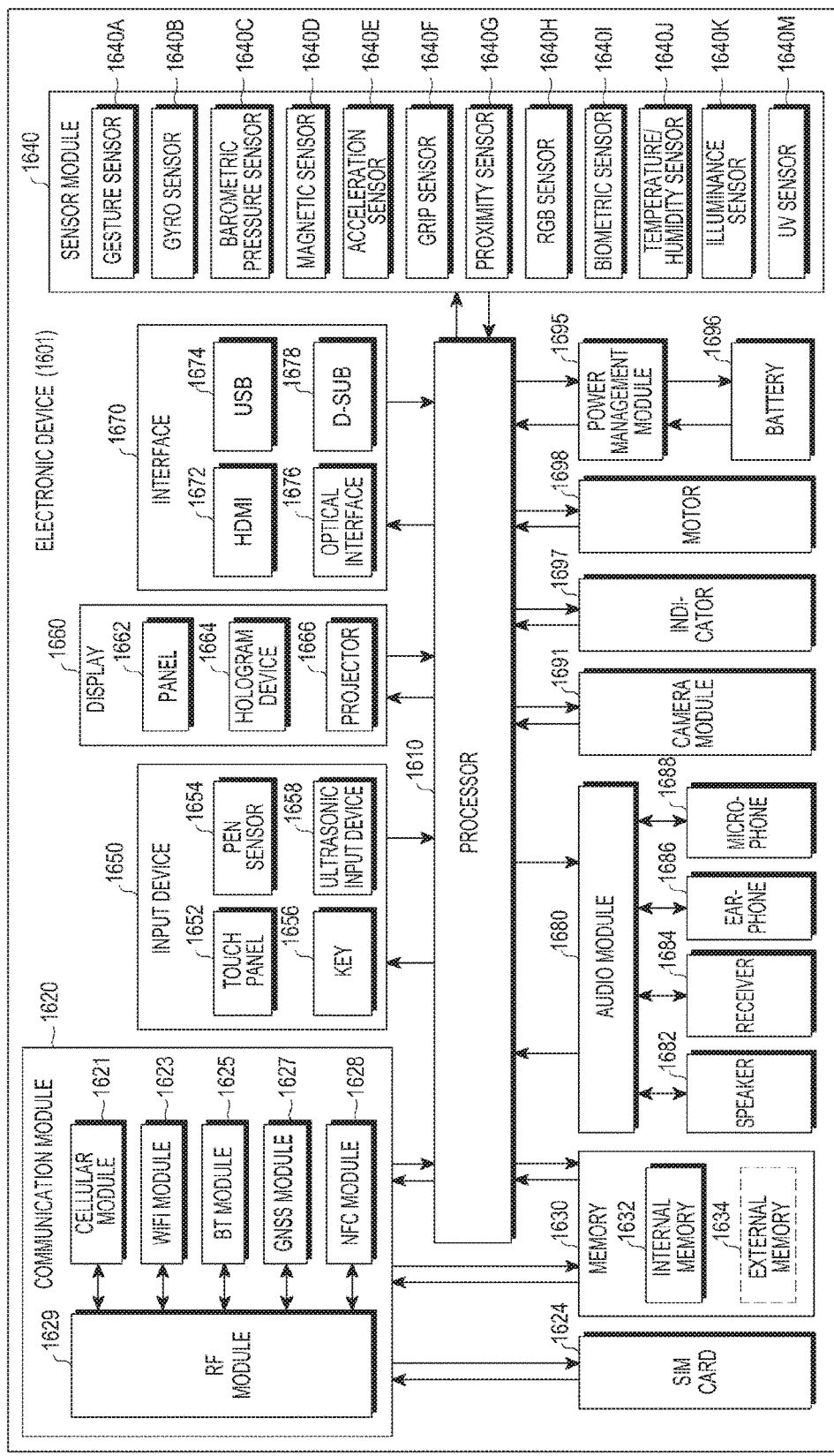
FIG. 16 is a block diagram of an electronic device according to an embodiment of the present disclosure.

FIG. 16 is a block diagram of an electronic device according to an embodiment of the present disclosure.

According to an embodiment of the present disclosure, an electronic device 1601 may include the entire or a part of the electronic device 1501 shown in FIG. 15.

Referring to FIG. 16, the electronic device 1601 includes at least one processor (e.g., application processor (AP)) 1610, a communication module 1620, a subscriber identification module 1624, a memory 1630, a sensor module 1640, an input device 1650, a display 1660, an interface 1670, an audio module 1680, a camera module 1691, a power management module 1695, a battery 1696, an indicator 1697 and a motor 1698. The processor 1610 may, for example, control a plurality of hardware or software components connected to the processor 1610 by running the operating system or application program, and may process and compute a variety of data. The processor 1610 may be implemented in, for example, a system on chip (SoC). In an embodiment of the present disclosure, the processor 1610 may further include a graphic processing unit (GPU) and/or an image signal processor (ISP). The processor 1610 may include at least some (e.g., a cellular module 1621) of the components shown in FIG. 16. The processor 1610 may load, on a volatile memory, a command or data received from at least one of other components (e.g., a non-volatile memory) and process the loaded data, and may store the resulting data in a non-volatile memory.

The communication module 1620 may be identical or similar in structure to the communication interface 1570 in FIG. 15. The communication module 1620 includes, for example, the cellular module 1621, a WiFi module 1623, a Bluetooth (BT) module 1625, a GNSS module 1627, an NFC module 1628, and an RF module 1629. The cellular module 1621 may, for example, provide a voice call service, a video call service, a messaging service or an Internet service over a communication network. In an embodiment of the present disclosure, the cellular module 1621 may perform identification and authentication for the electronic device 1601 within the communication network using the subscriber identification module (e.g., a SIM card) 1624. The cellular module 1621 may perform at least some of the functions that may be provided by the processor 1610. The cellular module 1621 may include a communication processor (CP). At least some (e.g., two or more) of the cellular module 1621, WiFi module 1623, the BT module 1625, the GNSS module 1627 or the NFC module 1628 may be included in one integrated chip (IC) or IC package. The RF module 1629 may, for example, transmit and receive communication signals (e.g., RF signals). The RF module 1629 may include, for example, a transceiver, a power amplifier module (PAM), a frequency filter, a low noise amplifier (LNA), or an antenna. At least one of the cellular module 1621, the WiFi module 1623, the BT module 1625, the GNSS module 1627 or the NFC module 1628 may transmit and receive RF signals through its own separate RF module.

The subscriber identification module 1624 may include, for example, a card with a subscriber identification module and/or an embedded SIM. The subscriber identification module 1624 may include unique identification information (e.g., integrated circuit card identifier (ICCID)) or subscriber information (e.g., international mobile subscriber identity (IMSI)).

The memory 1630 (e.g., the memory 1530) includes, for example, an internal memory 1632 or an external memory 1634. The internal memory 1632 may include at least one of, for example, a volatile memory (e.g., dynamic RAM (DRAM), static RAM (SRAM), synchronous dynamic RAM (SDRAM) or the like) or a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, hard drive, or solid state drive (SSD)). The external memory 1634 may further include a flash drive, for example, compact flash (CF), secure digital (SD), micro secure digital (Micro-SD), mini secure digital (Mini-SD), extreme digital (xD), a multimedia card (MMC), a memory stick or the like. The external memory 1634 may be functionally and/or physically connected to the electronic device 1601 through various interfaces.

The sensor module 1640 may, for example, measure the physical quantity or detect the operating status of the electronic device 1601, and convert the measured or detected information into an electrical signal. The sensor module 1640 includes at least one of, for example, a gesture sensor 1640A, a gyro sensor 1640B, a barometric pressure sensor 1640C, a magnetic sensor 1640D, an acceleration sensor 1640E, a grip sensor 1640F, a proximity sensor 1640G, a color sensor (e.g., red-green-blue (RGB) sensor) 1640H, a biometric sensor 1640I, a temperature/humidity sensor 1640J, an illuminance sensor 1640K, or a ultra violet (UV) sensor 1640M. Additionally or alternatively, the sensor module 1640 may include, for example, an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 1640 may further include a control circuit for controlling at least one or more sensors belonging thereto. The electronic device 1601 may further include a processor configured to control the sensor module 1640, independently of or as a part of the processor 1610, thereby to control the sensor module 1640 while the processor 1610 is in a sleep state.

The input device 1650 includes, for example, a touch panel 1652, a (digital) pen sensor 1654, a key 1656, or an ultrasonic input device 1658. The touch panel 1652 may, for example, use at least one of the capacitive, resistive, infrared or ultrasonic schemes. The touch panel 1652 may further include a control circuit. The touch panel 1652 may further include a tactile layer, to provide a tactile or haptic feedback to the user. The (digital) pen sensor 1654, for example, may be a part of the touch panel 1652, or may include a separate recognition sheet. The key 1656 may include, for example, a physical button, an optical key or a keypad. The ultrasonic input device 1658 may detect ultrasonic waves generated in an input tool using a microphone 1688, to identify the data corresponding to the detected ultrasonic waves.

The display 1660 (e.g., the display 1560) may include a panel 1662, a hologram device 1664, or a projector 1666, and a control circuit for controlling them. The panel 1662 may, for example, be implemented to be flexible, transparent or wearable. The panel 1662, together with the touch panel 1652, may be implemented as one module. In an embodiment of the present disclosure, the panel 1662 may include a pressure sensor (or a force sensor) capable of measuring the strength of the pressure for the user's touch. The pressure sensor may be implemented to be integrated with the touch panel 1652, or implemented as one or more sensors separate from the touch panel 1652. The hologram device 1664 may show stereoscopic images in the air using the interference of the light. The projector 1666 may display images by projecting the light onto the screen. The screen may, for example, be disposed on the inside or outside of the electronic device 1601. The interface 1670 includes, for example, an HDMI 1672, a USB 1674, an optical interface 1676 or a D-subminiature (D-sub) 1678. The interface 1670 may, for example, be included in the communication interface 1570 shown in FIG. 15. Additionally or alternatively, the interface 1670 may include, for example, a mobile high-definition link (MHL) interface, a secure digital (SD) card/multi-media card (MMC) interface or an infrared data association (IrDA) interface.

The audio module 1680 may, for example, convert the sounds and the electrical signals bi-directionally. At least some components of the audio module 1680 may, for example, be included in the I/O interface 1550 shown in FIG. 15. The audio module 1680 may, for example, process the sound information that is input or output through a speaker 1682, a receiver 1684, an earphone 1686 or the microphone 1688. The camera module 1691 is, for example, a device capable of capturing still images and videos. In an embodiment of the present disclosure, the camera module 1691 may include one or more image sensors (e.g., a front image sensor or a rear image sensor), a lens, an image signal processor (ISP), or a flash (e.g., an LED or xenon lamp). The power management module 1695 may, for example, manage the power of the electronic device 1601.

In an embodiment of the present disclosure, the power management module 1695 may include. for example, a power management integrated circuit (PMIC), a charger integrated circuit (IC), or a battery gauge. The PMIC may have the wired and/or wireless charging schemes. The wireless charging scheme may include, for example, a magnetic resonance scheme, a magnetic induction scheme, or an electromagnetic scheme, and the power management module 1695 may further include additional circuits (e.g., a coil loop, a resonant circuit, a rectifier or the like) for wireless charging. The battery gauge may, for example, measure the remaining charge capacity, charging voltage, charging current or temperature of the battery 1696. The battery 1696 may include, for example, a rechargeable battery and/or a solar battery.

The indicator 1697 may indicate specific status (e.g., boot status, message status, charging status or the like) of the electronic device 1601 or a part (e.g. the processor 1610) thereof. The motor 1698 may convert an electrical signal into mechanical vibrations to generate a vibration or haptic effect. The electronic device 1601 may include a mobile TV support device (e.g., GPU) capable of processing the media data that is based on the standards such as, for example, digital multimedia broadcasting (DMB), digital video broadcasting (DVB) or MediaFLO™.

Each of the components described herein may be configured with one or more components, names of which may vary depending on the type of the electronic device. The electronic device (e.g., the electronic device 1601) may be configured to include at least one of the components described herein, some of which may be omitted, or may further include additional other components. Further, some of the components of the electronic device according to an embodiment of the present disclosure may be configured as one entity by being combined, thereby performing the functions of the components before their combination, in the same manner.

Figure 17:
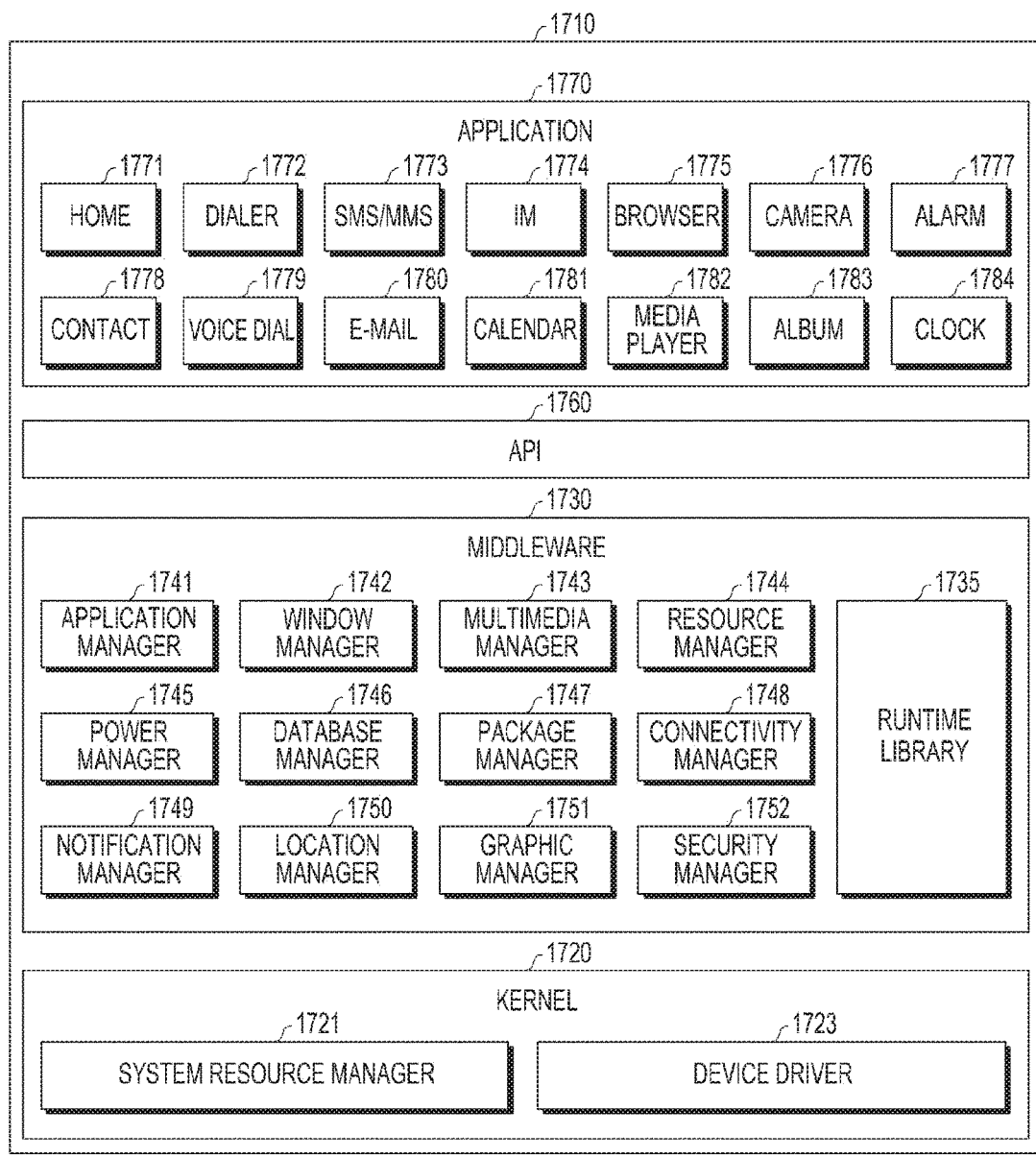
FIG. 17 is a block diagram of a program module according to an embodiment of the present disclosure.

FIG. 17 is a block diagram of a program module according to an embodiment of the present disclosure.

According to an embodiment of the present disclosure, a program module 1710 (e.g., the program 1540) may include an operating system (OS) for controlling the resources related to the electronic device 1501, and/or a variety of applications (e.g., the application program 1547) that run on the operating system. The operating system may be, for example, Android™, iOS™, Windows™, Symbian™, Tizen™, Bada™ or the like.

Referring to FIG. 17, the program module 1710 includes a kernel 1720 (e.g., the kernel 1541), a middleware 1730 (e.g., the middleware 1543), an application programming interface (API) 1760 (e.g., the API 1545), and/or an application(s) 1770 (e.g, the application program 1547). At least a part of the program module 1710 may be preloaded on the electronic device, or downloaded from the electronic devices 1502 and 1504 and the server 1506.

The kernel 1720 (e.g., the kernel 1541) includes, for example, a system resource manager 1721 and/or a device driver 1723. The system resource manager 1721 may control, allocate or recover the system resources. In an embodiment of the present disclosure, the system resource manager 1721 may include a process manager, a memory manager, a file system manager and the like. The device driver 1723 may include, for example, a display driver, a camera driver, a Bluetooth driver, a shared memory driver, a USB driver, a keypad driver, a WiFi driver, an audio driver, or an inter-process communication (IPC) driver. The middleware 1730, for example, may provide a function that is required in common by the application(s) 1770, or may provide various functions to the application 1770 through the API 1760 so that the application 1770 may efficiently use the limited system resources within the electronic device.

The middleware 1730 (e.g., the middleware 1543) includes at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, or a security manager 1752.

The runtime library 1735 may include, for example, a library module that a compiler uses to add a new function through a programming language while the application 1770 is run. The runtime library 1735 may perform an I/O management function, a memory management function, an arithmetic function and the like. The application manager 1741 may, for example, manage the life cycle of at least one of the application(s) 1770. The window manager 1742 may manage the graphic user interface (GUI) resources that are used on the screen. The multimedia manager 1743 may determine the format required for playback of various media files, and encode or decode the media files using a codec for the format. The resource manager 1744 may manage a source code or a memory space, for the application(s) 1770. The power manager 1745, for example, may manage the battery's capacity or power, and provide power information required for an operation of the electronic device. The power manager 1745 may interwork with the basic input/output system (BIOS). The database manager 1746 may create, search or update the database that is to be used by at least one of the application(s) 1770. The package manager 1747 may manage installation or update of applications that are distributed in the form of a package file.

The connectivity manager 1748 may, for example, manage wireless connection. The notification manager 1749 may notify the user of the events such as message arrival, appointments and proximity alerts. The location manager 1750 may manage the location information of the electronic device. The graphic manager 1751 may manage the graphic effect to be provided to the user, or the user interface related thereto. The security manager 1752 may provide, for example, the system security or user authentication. In an embodiment of the present disclosure, the middleware 1730 may include a telephony manager for managing the voice or video call function of the electronic device, or a middleware module capable of forming a combination of the functions of the above-described components. The middleware 1730 may provide a module specialized for each type of the operating system. Further, the middleware 1730 may dynamically remove some of the existing components, or add new components. The API 1760, for example, is a set of API programming functions, and may be provided in a different configuration depending on the operating system. For example, for Android™ or iOS™, the API 1760 may provide one API set per platform, and for Tizen™, the API 1760 may provide two or more API sets per platform.

The application 1770 includes, for example, one or more applications for providing functions of a home 1771, a dialer 1772, a short message service/multimedia messaging service (SMS/MMS) 1773, an instant message (IM) 1774, a browser 1775, a camera 1776, an alarm 1777, a contact 1778, a voice dial 1779, an Email 1780, a calendar 1781, a media player 1782, an album 1783, a clock 1784, healthcare (e.g., a function for measuring the quantity of exercise, the blood glucose level and the like), or environmental information provision (e.g., a function for providing information about the atmospheric pressure, humidity, temperature and the like).

In an embodiment of the present disclosure, the application 1770 may include an information exchange application capable of supporting information exchange between the electronic device and external electronic devices. The information exchange application may include, for example, a notification relay application for delivering specific information to the external electronic devices, or a device management application for managing the external electronic devices. For example, the notification relay application may deliver notification information generated in other applications of the electronic device, to the external electronic devices, or the notification relay application may receive notification information from an external electronic device, and provide the received notification information to the user. The device management application may, for example, manage at least one function (e.g., a function of adjusting the turn-on/off of the external electronic device itself (or some components thereof) or the brightness (or the resolution) of the display) of the external electronic device communicating with the electronic device, and may manage (e.g., install, delete or update) an application operating in the external electronic device. The application 1770 may include an application (e.g., a healthcare application for a mobile medical device) that is specified depending on the properties of the external electronic devices. The application 1770 may include an application received or downloaded from the external electronic device. At least a part of the program module 1710 may be implemented (or executed) by software, firmware, hardware (e.g., the processor 1610) or a combination thereof, and may include a module, a program, a routine, an instruction set or a process, for performing one or more functions.

The term 'module' as used herein may refer to a unit that includes hardware, software or firmware. The term 'module' may be interchangeably used with terms such as, for example, unit, logic, logical block, component, or circuit. The 'module' may be the minimum unit of an integrally constructed part, or a part thereof. The 'module' may be the minimum unit for performing one or more functions, or a part thereof. The 'module' may be implemented mechanically or electronically. For example, the 'module' may include at least one of an application-specific integrated circuit (ASIC) chip, field-programmable gate arrays (FPGAs), or a programmable-logic device, which are known or will be developed in the future, and which perform certain operations. At least a part of the apparatus (e.g., modules or functions thereof) or method (e.g., operations) according to an embodiment of the present disclosure may, for example, be implemented by an instruction that is stored in computer-readable storage media (e.g., the memory 1530) in the form of a program module. If the instruction is executed by a processor (e.g., the processor 1520), the processor may perform a function corresponding to the instruction. The computer-readable storage media may include magnetic media (e.g., a hard disk, a floppy disk, and magnetic tape), optical media (e.g., a compact disc read only memory (CD-ROM) and a digital versatile disc (DVD)), magneto-optical media (e.g., a floptical disk), and an internal memory. An instruction may include a code made by a compiler, or a code that may be executed by an interpreter. The module or program module according to an embodiment may include at least one of the above-described components, some of which may be omitted, or may further include other components. Operations performed by a module, a program module or other components may be performed in a sequential, parallel, iterative or heuristic way. Some operations may be performed in a different order or omitted, or other operations may be added.

As is apparent from the foregoing description, an electronic device, a wearable device and a method for controlling a screen of the electronic device according to an embodiment of the present disclosure may control an object displayed on a display of the electronic device by allowing the user to manipulate the wearable device, the worn position of which is familiar to the user, without searching for the button of the electronic device.

An electronic device, a wearable device and a method for controlling a screen of the electronic device according to an embodiment of the present disclosure may control settings related to a display of the electronic device or perform user authentication by allowing the user to manipulate the wearable device.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a housing;
a display;
a communication module disposed inside the housing;
a processor disposed inside the housing and electrically connected to the communication module; and
a memory electrically connected to the processor;
wherein the memory stores instructions, which when executed by the processor cause the electronic device to:
control the display to display a virtual reality (VR) screen in a stereoscopic image format,
control the display to display an object on the VR screen,
receive, from a first external device which is a watch type device, first rotation input information entered by a wheel dial member or a crown included in the first external device through the communication module,
control the displayed object on the VR screen based on the received first rotation input information,
wherein controlling the displayed object on the VR screen includes moving the displayed object according to the first rotation input information which is defined based on a rotation direction, a rotation speed and a rotation amount of the rotation, and
in response to receiving second rotation input information indicating a rotation at a rotation speed greater than or equal to a predetermined value from the first external device, control the display to display a list of at least one item which is executed in the electronic device for a predetermined time.

2. The electronic device of claim 1, wherein the instructions, when executed by the processor, cause the electronic device to:
receive third rotation input information from the first external device while the list of the at least one item is displayed; and
control the display to display an execution screen of a first item corresponding to the third rotation input information from among the at least one item.

3. The electronic device of claim 1, wherein the instructions, when executed by the processor, cause the electronic device to:
display a screen related to first content from among the at least one content on the display;
receive, from the first external device, third rotation input information indicating a rotation with a rotation amount at a rotation speed less than or equal to a predetermined value; and
control the display to display a screen related to second content corresponding to the third rotation amount from among the at least one content.

4. The electronic device of claim 1, wherein the instructions, when executed by the processor, cause the electronic device to:
display a user authentication screen on the display;
identify a second external device transmitting identification information in a predetermined format among at least one external device; and
perform authentication on the second external device based on second rotation input information received from the first external device.

5. The electronic device of claim 4, wherein the instructions, when executed by the processor, cause the electronic device to:

control at least one dial for entering a password of at least one digit to be displayed on the user authentication screen; and
identify a first dial corresponding to third rotation input information received from the first external device among the at least one dial.

6. The electronic device of claim 5, wherein the instructions, when executed by the processor cause the electronic device to:
upon identifying the first dial, receive fourth rotation input information from the first external device; and
rotate and display the first dial in response to the fourth rotation input information.

7. The electronic device of claim 1, wherein the instructions, when executed by the processor, cause the electronic device to:
in response to receiving, from the first external device, second rotation input information including a second rotation speed corresponding to a predetermined value, change settings related to the display, which correspond to a value of the second rotation speed.

8. The electronic device of claim 7,
wherein the settings related to the display include at least one of settings for a brightness of the display, a size of an output screen, and a resolution of an output screen.

9. A method for controlling a screen in an electronic device, the method comprising:
displaying, on a display, a virtual reality (VR) screen in a stereoscopic image format,
displaying, on the display, an object on the VR screen,
receiving, from a first external device which is a watch type device, first rotation input information entered by a wheel dial member or a crown included in the first external device;
controlling the displayed object on the VR screen based on the first received rotation input information;
wherein controlling the displayed object on the VR screen comprises moving the displayed object according to the first rotation input information which is defined based on a rotation direction, a rotation speed and a rotation amount of the rotation; and
in response to receiving second rotation input information indicating a rotation at a rotation speed greater than or equal to a predetermined value from the first external device, displaying a list of at least one item which is executed in the electronic device for a predetermined time.

10. The method of claim 9, further comprising:
receiving third rotation input information from the first external device while the list of the at least one item is displayed; and
displaying an execution screen of a first item corresponding to the third rotation input information from among the at least one item.

11. The method of claim 9, further comprising:
displaying a screen related to first content from among the at least one content on the display;
receiving, from the first external device, third rotation input information indicating a rotation with a rotation amount at a rotation speed less than or equal to a predetermined value; and
displaying a screen related to second content corresponding to the third rotation amount from among the at least one content.

12. The method of claim 9, further comprising:
displaying a user authentication screen on the display;
identifying a second external device transmitting identification information in a predetermined format among at least one external device; and
performing authentication on the second external device based on second rotation input information received from the first external device.

13. The method of claim 12, further comprising:
displaying at least one dial for entering a password of at least one digit on the user authentication screen; and
identifying a first dial corresponding to third rotation input information received from the first external device among the at least one dial.

14. The method of claim 13, further comprising:
upon identifying the first dial, receiving fourth rotation input information from the first external device; and
rotating and displaying the first dial in response to the fourth rotation input information.

15. The method of claim 9, further comprising:
in response to receiving, from the first external device, second rotation input information including a second rotation speed corresponding to a predetermined value;
changing settings related to the display, which correspond to a value of the second rotation speed.

16. The method of claim 15,
wherein the settings related to the display include at least one of settings for a brightness of the display, a size of an output screen, and a resolution of an output screen.

* * * * *